(12) United States Patent
Reiker

(10) Patent No.: US 6,242,696 B1
(45) Date of Patent: *Jun. 5, 2001

(54) ELECTRICAL BOX WITH SUPPLEMENTAL SUPPORT FOR CARRYING FIXTURES

(75) Inventor: Kenneth H. Reiker, Shalimar, FL (US)

(73) Assignee: Reiker Enterprises of Northwest Florida, Inc., Solvay, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/321,741

(22) Filed: May 28, 1999

Related U.S. Application Data

(63) Continuation-in-part of application No. 08/862,378, filed on May 23, 1997, now Pat. No. 5,909,006, and a continuation-in-part of application No. 08/862,379, filed on May 23, 1997, now Pat. No. 5,965,845, and a continuation-in-part of application No. 08/862,380, filed on May 23, 1997, and a continuation-in-part of application No. 08/490,757, filed on Jun. 15, 1995, now Pat. No. 5,677,512, and a continuation-in-part of application No. 08/371,695, filed on Jan. 12, 1995, now Pat. No. 5,854,443.

(60) Provisional application No. 60/023,060, filed on Aug. 2, 1996, and provisional application No. 60/018,227, filed on May 24, 1996.

(51) Int. Cl.$^7$ ...................................................... H02B 1/30
(52) U.S. Cl. .............................. 174/62; 220/3.3; 220/3.9; 248/906; 248/205.3; 29/772
(58) Field of Search ................................ 174/62, 51, 58, 174/61, 48, 64, 53, 57; 220/3.2, 3.3, 3.8, 3.9, 3.94, 4.02; 248/906, 205.3; 29/772, 729, 876

(56) References Cited

U.S. PATENT DOCUMENTS

| | | |
|---|---|---|
| Re. 33,147 | 1/1990 | Reiker . |
| Re. 34,603 | 5/1994 | Caison et al. . |
| 950,176 | 2/1910 | Hublinger . |
| 1,040,175 | 10/1912 | Earhart . |
| 1,066,706 | 7/1913 | Caine . |
| 1,699,414 | 1/1929 | Weinstein . |
| 1,805,027 | 5/1931 | Adell . |
| 1,824,708 | 9/1931 | Davis et al. . |
| 1,922,432 | 8/1933 | Gould . |
| 2,316,389 | 4/1943 | Atkinson . |
| 2,374,993 | 5/1945 | Haynes . |
| 2,423,757 | 7/1947 | Dedge . |
| 2,471,301 | 5/1949 | Boosey . |
| 2,713,983 | 7/1955 | Kay . |
| 2,959,633 | 11/1960 | Palmer et al. . |

(List continued on next page.)

FOREIGN PATENT DOCUMENTS

| | | |
|---|---|---|
| 2436518 | 5/1980 | (FR) . |
| 1309950 | 3/1973 | (GB) . |

OTHER PUBLICATIONS

Fan Brace Inc./Manufacturers of the Original SAF–T–Brace™, Fan Brace Inc., Bryan, Texas, 8 pages, printed Jul. 1994.

Fan Brace Catalog/Fan Brace Inc., 16 pages, Fan Brace Inc. Bryan, Texas, undated.

*Primary Examiner*—Dean A. Reichard
*Assistant Examiner*—Dhiru R. Patel
(74) *Attorney, Agent, or Firm*—Shlesinger, Arkwright & Garvey LLP

(57) ABSTRACT

An electrical junction box or mounting assembly includes a box having a top wall and a side wall. The side wall extends downwardly away from the top wall and defines a cavity therein. A fixture support is provided. A dimple is provided in the top wall, and the fixture support engages the dimple. The fixture support may be sufficiently smooth for preventing wear to plastic-coated electrical wire which engages exposed surfaces of the fixture support. A side mounting plate may be provided for attaching the box to the side of a support. An adhesive may be provided for securing the box to a support. A fixture support-receiving cavity not connected with the main junction box cavity may be provided.

20 Claims, 21 Drawing Sheets

U.S. PATENT DOCUMENTS

| | | |
|---|---|---|
| 3,168,613 | 2/1965 | Palmer . |
| 3,340,349 | 9/1967 | Zerwes . |
| 3,472,945 | 10/1969 | Trachtenberg . |
| 3,616,096 | 10/1971 | Roeder . |
| 3,709,401 | 1/1973 | Walstrom . |
| 3,740,451 | 6/1973 | Schindler et al. . |
| 3,770,872 | 11/1973 | Brown . |
| 3,798,584 * | 3/1974 | Person ................................ 439/102 |
| 4,062,512 * | 12/1977 | Arnold ............................. 248/309.1 |
| 4,176,758 | 12/1979 | Glick . |
| 4,275,862 | 6/1981 | Takagi et al. . |
| 4,281,773 | 8/1981 | Mengeu . |
| 4,304,957 | 12/1981 | Slater et al. . |
| 4,306,109 | 12/1981 | Nattel . |
| 4,315,100 | 2/1982 | Haslbeck et al. . |
| 4,408,696 | 10/1983 | Crosson . |
| 4,424,406 | 1/1984 | Slater et al. . |
| 4,642,956 | 2/1987 | Harbeke . |
| 4,880,128 | 11/1989 | Jorgensen . |
| 4,892,211 | 1/1990 | Jorgensen . |
| 4,909,405 | 3/1990 | Kerr, Jr. . |
| 4,919,292 | 4/1990 | Hsu . |
| 4,960,964 | 10/1990 | Schnell et al. . |
| 4,988,067 | 1/1991 | Propp et al. . |
| 5,074,515 | 12/1991 | Carter, Jr. . |
| 5,085,393 | 2/1992 | Ryan . |
| 5,178,350 | 1/1993 | Vink et al. . |
| 5,303,894 | 4/1994 | Deschamps et al. . |
| 5,359,152 | 10/1994 | Hone-Lin . |
| 5,407,088 | 4/1995 | Jorgensen et al. . |
| 5,435,514 | 7/1995 | Kerr, Jr. . |
| 5,484,076 * | 1/1996 | Petoushka ....................... 248/906 X |
| 5,606,147 * | 2/1997 | Deschamps et al. .................. 174/48 |
| 5,762,223 | 6/1998 | Kerr, Jr. . |
| 5,860,548 | 1/1999 | Kerr, Jr. . |
| 5,909,006 * | 6/1999 | Reiker .................... 174/62 |
| 5,959,246 * | 9/1999 | Gretz .................... 174/50 |
| 5,965,844 * | 10/1999 | Lippa .................... 174/49 |
| 5,981,874 * | 11/1999 | Reiker .................... 174/63 |

\* cited by examiner

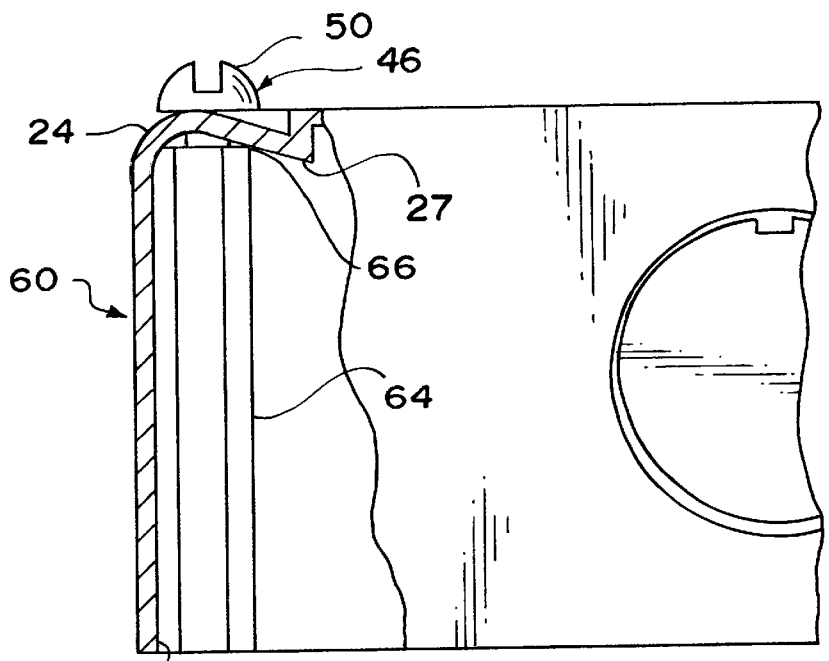
FIG. 6
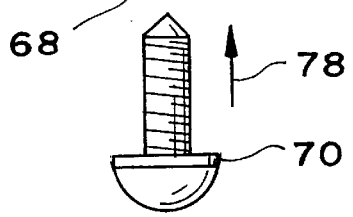
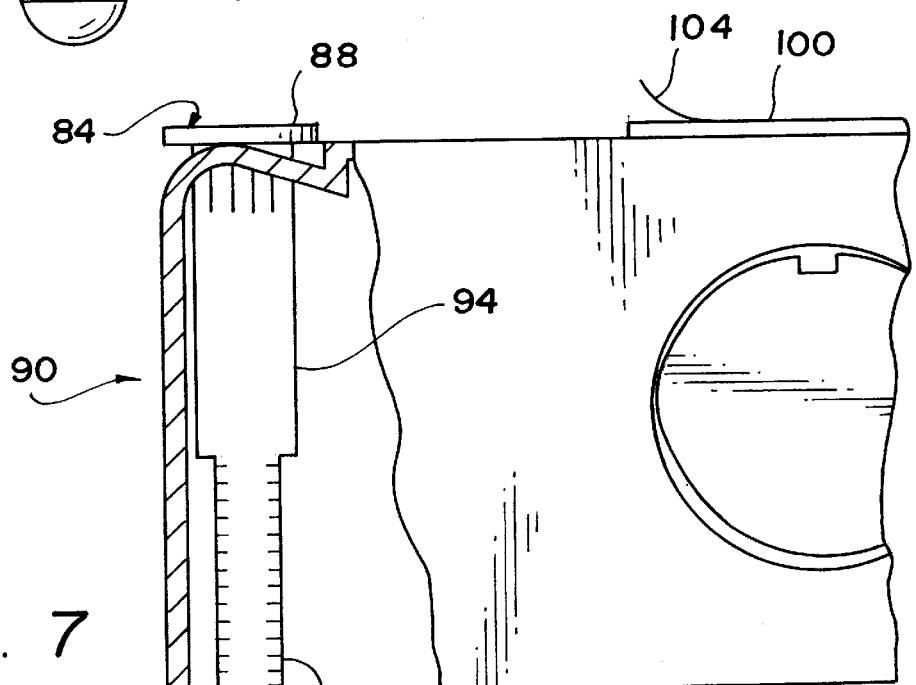
FIG. 7
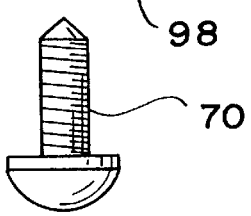

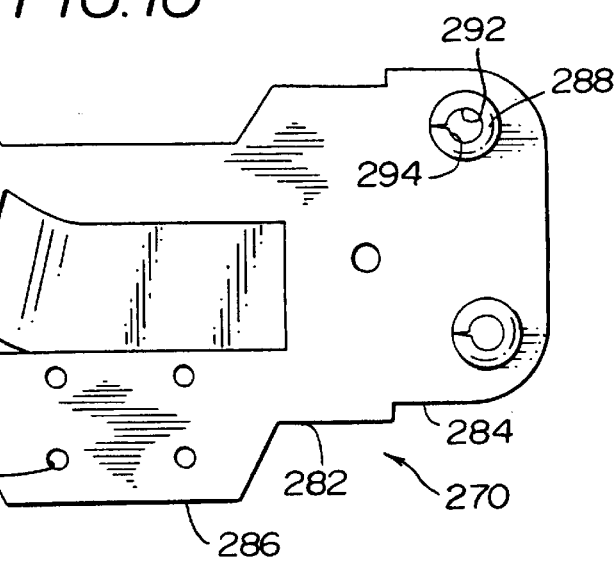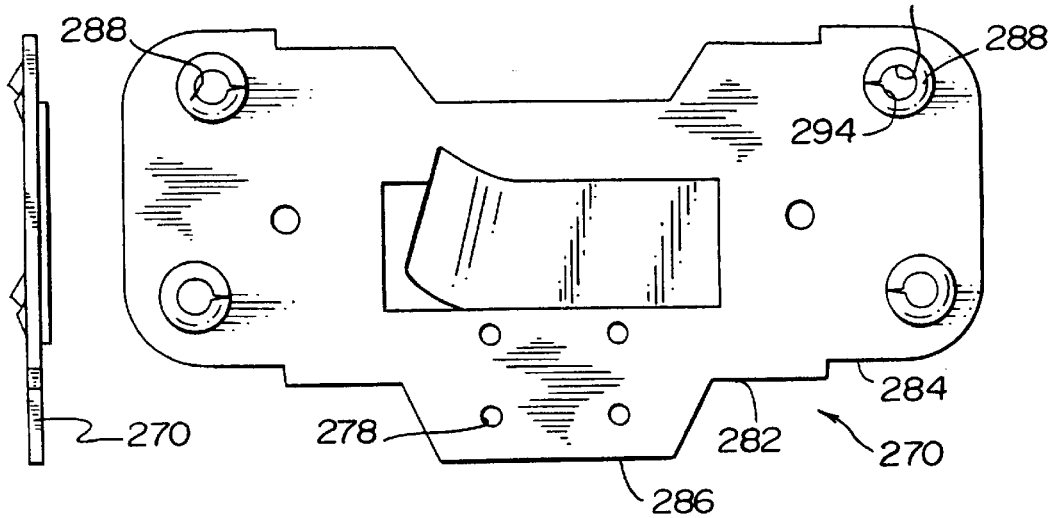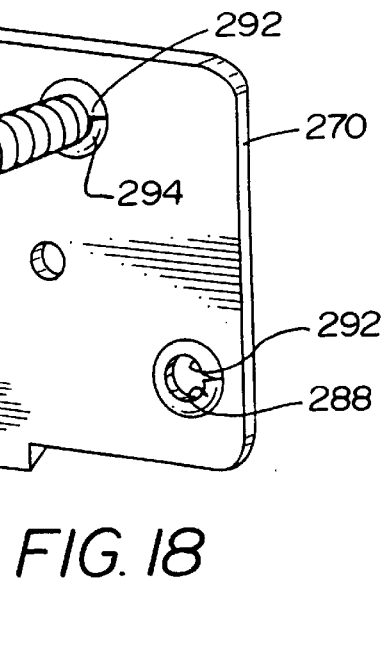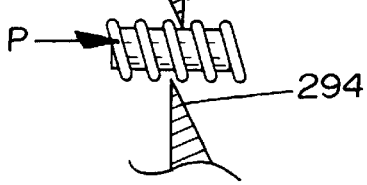

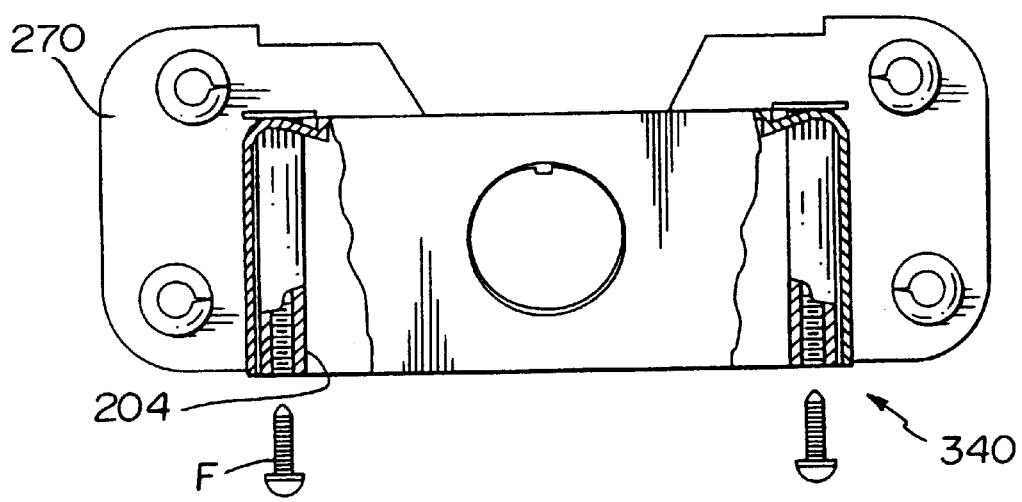
FIG. 22
FIG. 23
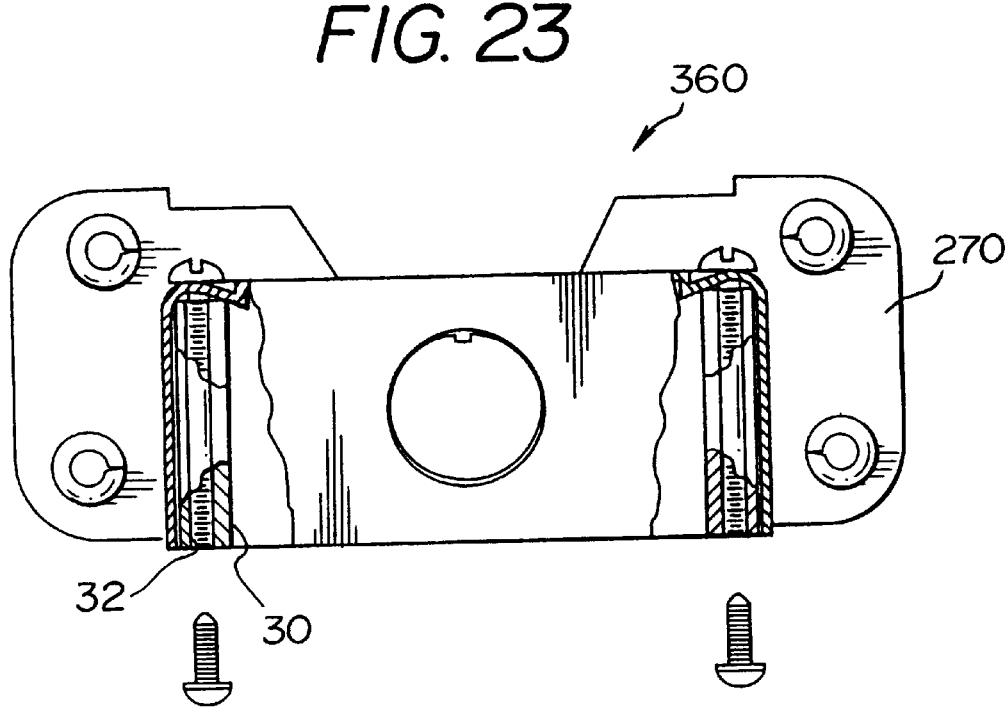

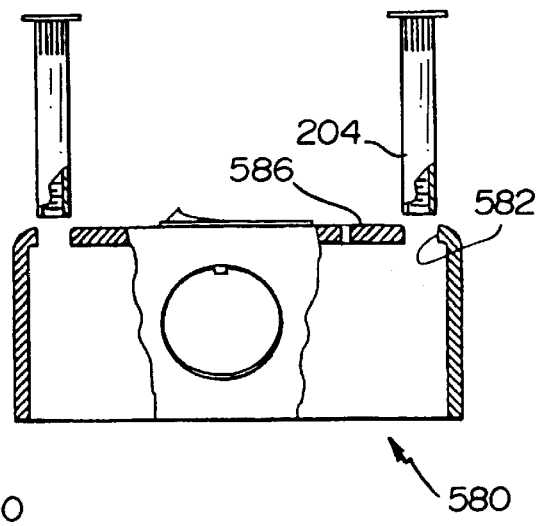
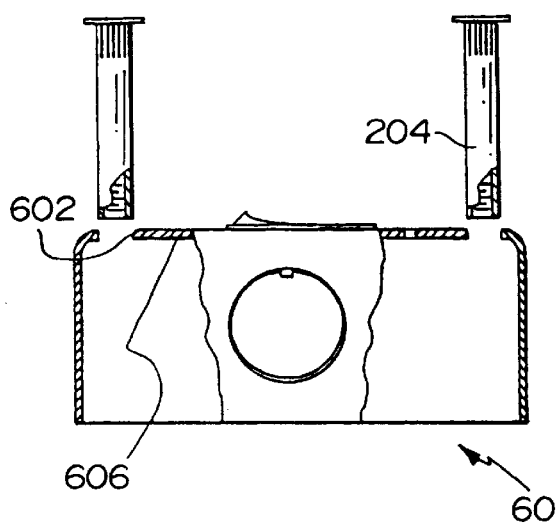
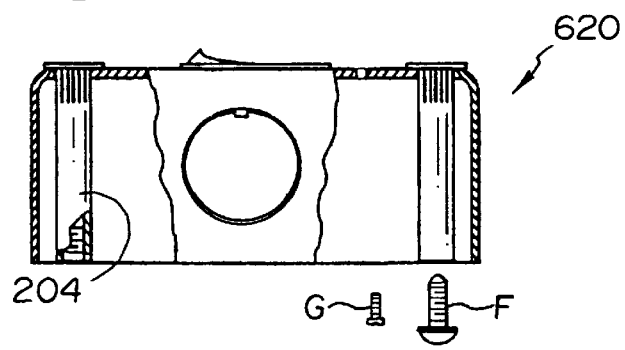
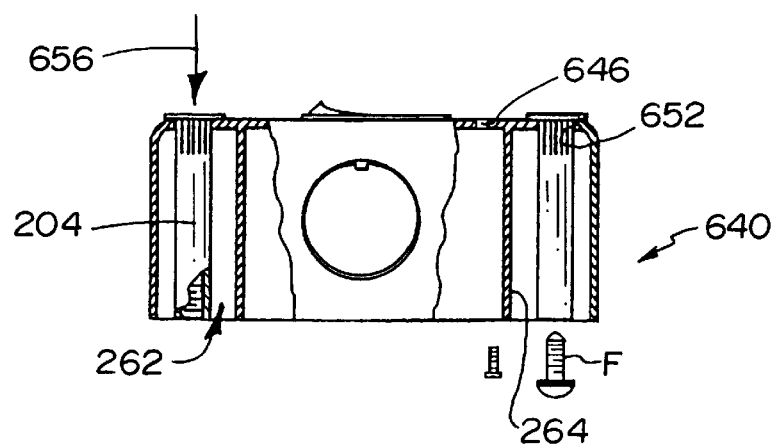

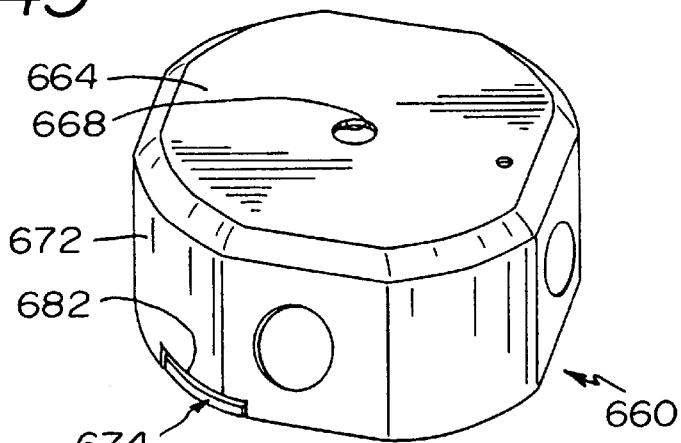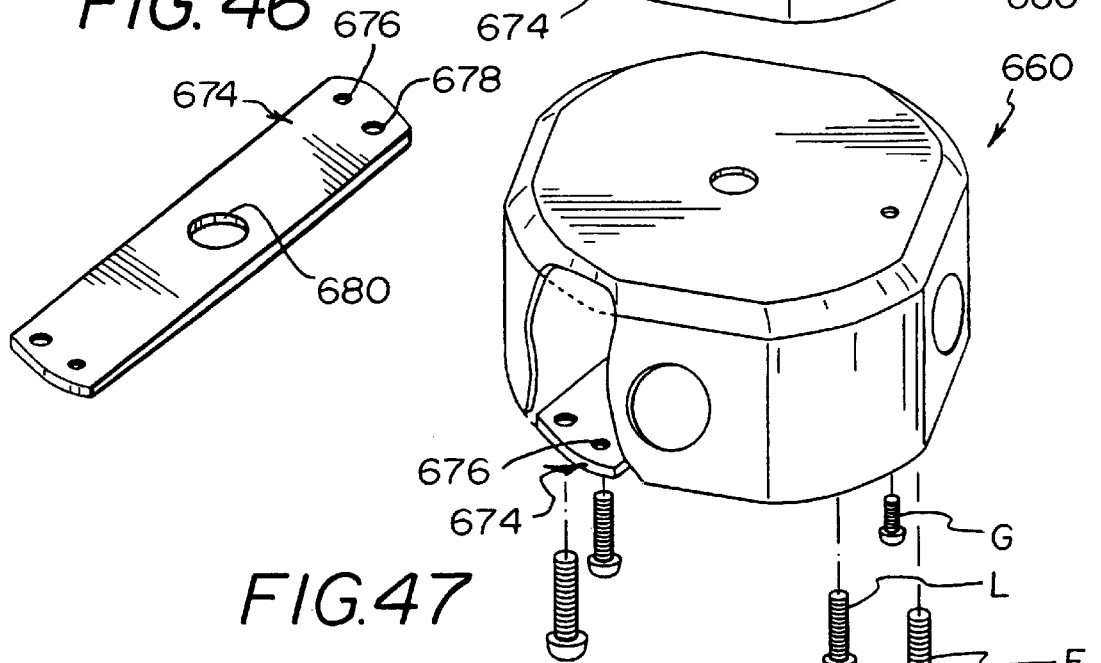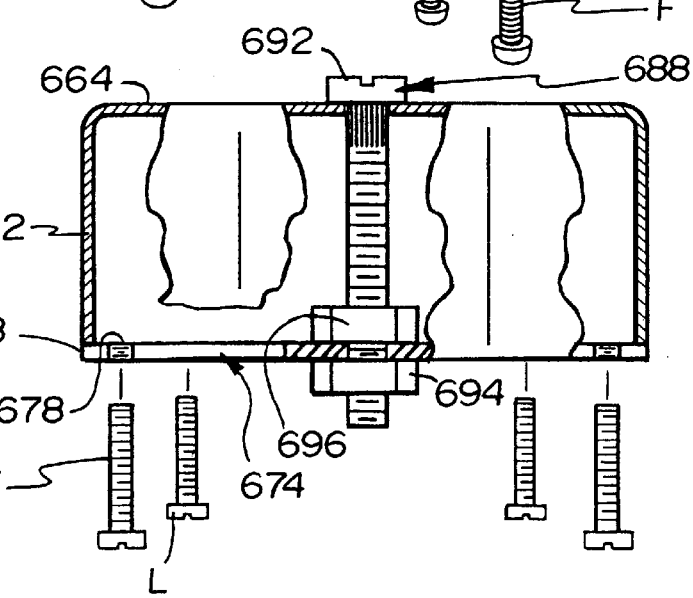

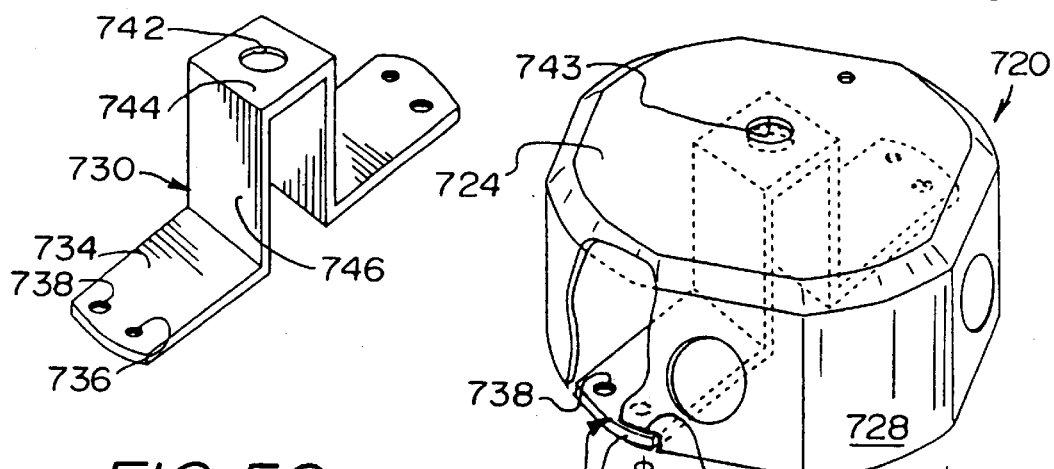
FIG. 49
FIG. 50
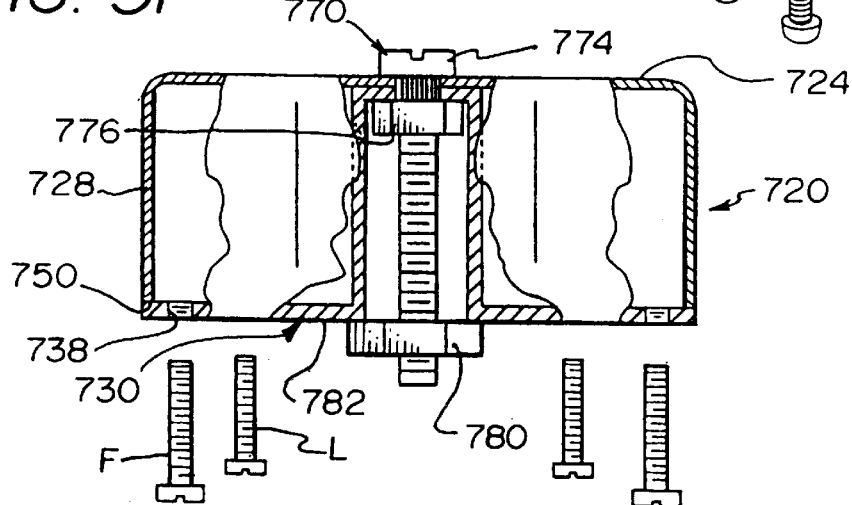
FIG. 51
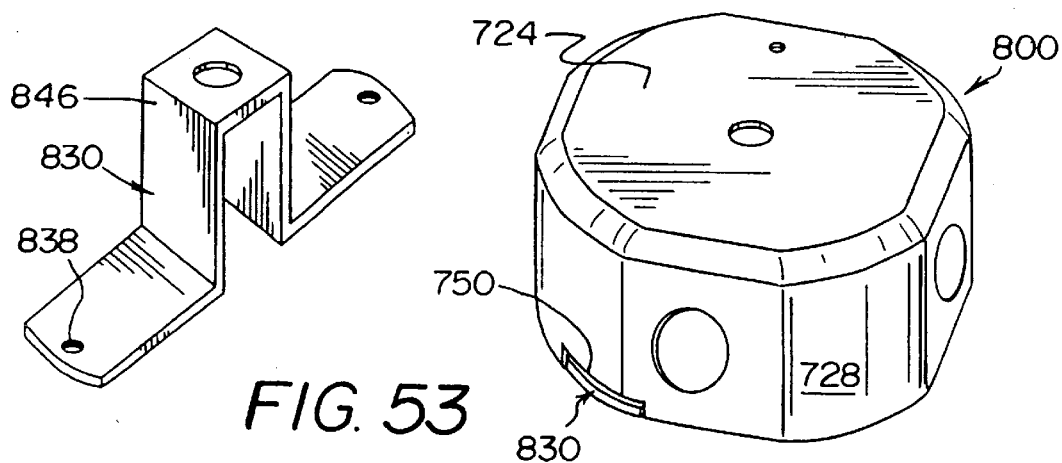
FIG. 52
FIG. 53

ELECTRICAL BOX WITH SUPPLEMENTAL SUPPORT FOR CARRYING FIXTURES

CROSS-REFERENCE TO RELATED APPLICATIONS

This application is a continuation-in-part of application Ser. No. 08/862,378, filed May 23, 1997 U.S. Pat. No. 5,909,006, which claims the priority of application Ser. No. 60/023,060, filed Aug. 2, 1996, and which claims the priority of application Ser. No. 60/018,227, filed May 24, 1996, and application Ser. No. 08/862,378 is a continuation-in-part of application Ser. No. 08/490,757, filed Jun. 15, 1995, now U.S. Pat. No. 5,677,512, and application Ser. No. 08/490, 757 is a continuation-in-part of application Ser. No. 08/371, 695, filed Jan. 12, 1995, now U.S. Pat. No. 5,854,443, and this application is a continuation-in-part of application Ser. No. 08/862,379, filed May 23, 1997, now U.S. Pat. No. 5,965,845 and this application is a continuation-in-part of application Ser. No. 08/862,380, filed May 23, 1997, and each of which is incorporated herein by reference.

FIELD OF THE INVENTION

The present invention relates to electrical boxes and methods of producing the same.

BACKGROUND OF THE INVENTION

Consumers, updated National Electrical Codes (NEC), and Underwriter Laboratories (UL) requirements all require that electrical boxes be made stronger than in the prior art.

OBJECTS AND SUMMARY OF THE INVENTION

An object of the invention is to overcome the drawbacks of known electrical boxes.

A further object of the invention includes making electrical boxes which use the standard punched-out, stamped electrical boxes in a more intelligent fashion.

Another object of the invention is to provide an electrical box which is free of fixture supports within the cavity of the box.

A further object of the invention is to provide an electrical box which can alternately support lightweight fixtures, such as lights, and heavier fixtures, such as ceiling fans, and chandeliers, so that the user is provided with two (2) boxes in one, and so that the manufacturer need produce only half as many models, the retailer need only stock half as many electrical boxes, and the installer need only carry half as many parts to the job site.

A still further object of the invention is to provide an electrical box which can be used alternately for supporting a fixture of the type which uses 8–32 fixture fasteners and a fixture of the type using a pair of 10–32 inch fasteners.

Another object of the invention is to provide an electrical box which includes fixture supports, and other components, which do not loosen during manufacture, shipment, storage, selling, and use thereof.

A further object of the invention is to provide an electrical box which has an increased cavity volume, while not increasing the volume defined by the exterior of the electrical box.

Yet another object of the invention is to provide an electrical box which can be mounted to the side of a joist and/or to the bottom face of a joist and/or to the side/bottom face of stud.

A further object of the invention is to provide an electrical box which can be used for fixture fasteners of the type which extend outwardly of the cavity of the box and/or are contained substantially within the cavity of the electrical box.

Another object of the invention is to provide an electrical box which has improved fasteners for securing mounting screws during installation, to free up both of the installer's hands to assist in the installation of the electrical box.

Yet another object of the invention is to take out the radius of a standard industry size electrical box so that a support screw for supporting a fixture can be located the proper distance from a second support screw to meet National Electrical Code (NEC) standard.

Another object of the invention is to eliminate the problem of the upper radius of between the top wall and side wall of electrical boxes that prevents support studs for supporting fixtures from being fitted next to the inside face of such side wall.

Another object of the invention is to achieve a strengthened electrical box with a supplemental support within a standard so-called "4×4" box, while maintaining the near universal 3.5 inch (8.9 cm) spacing between the fixture supports so that the box is usable with standard light fixtures, ceiling fans, and the like.

It is likewise an object of the invention to provide supplemental metal inserts in the electrical boxes to enhance the carrying strength of the electrical boxes.

A further object of the invention is to provide studs in the electrical boxes that strengthen the electrical boxes.

Yet another object of the invention is to provide studs in the electrical boxes which cover the threads of standard screws so that no screw threads are present in the interior of such electrical boxes.

A still further object of the invention is to provide an electrical box having a supplemental support with a sufficiently smooth exterior for preventing wear to the plastic coating of plastic-coated electrical wire.

It is yet another object of the invention to provide electrical boxes in which added supports, such as studs, are added during the manufacturing process to eliminate problems in prior art electrical boxes, as well as to strengthen the inventive electrical boxes.

Another object of the invention is to provide a junction box having a supplemental support, yet which requires no welding during assembly thereof.

Yet another object of the invention is to provide an electrical box having components which are easily fabricated, added to the electrical box, and assembled in the final form by the operation of screwing or riveting, yet which do not loosen when subjected to static and/or dynamic loading.

A still further object of the invention is to provide a junction box in which the supplemental support for carrying static and dynamic loads automatically engages the side walls of the junction box during assembly and/or in use thanks to the use of cutouts in the top wall thereof and/or thanks to the auxiliary support being configured for engaging the side wall thereof when the auxiliary support is attached and located in its attached, final form ready for use.

A still further object of the invention is to provide a junction box in which the supplemental support for carrying static and dynamic loads automatically engages the side walls of the junction box during assembly thanks to the use of dimpling in the top wall thereof and thanks to the supplemental support being configured for engaging the side wall thereof when the auxiliary support is attached and located in its attached, final form ready for use.

A still further object of the invention is to provide a junction box capable of carrying static and/or dynamic loads having an auxiliary support and that is assembled with fewer parts and with fewer steps than known devices.

It is a yet further object that all the above be carried out with an electrical box which carries the load of supported static and dynamic fixtures better than known electrical boxes.

In summary, the present invention is directed to an electrical junction box or mounting assembly which includes a box having a top wall and a side wall. The side wall extends downwardly away from the top wall and defines a cavity therein. A fixture support is provided. A dimple is provided in the top wall, and the fixture support abuts the dimple. Preferably, the fixture support is configured for preventing wear to plastic-coated electrical wire which engages exposed surfaces of the fixture support.

The present invention is likewise directed to a junction box having a single support capable of supporting fixtures of the type having one or more fixture fasteners.

These objects and advantages as well as others will be readily apparent from a review of the following description and drawings.

The drawings show a variety of embodiments of the invention, as will be clear from reading the description below.

It is important to note that the use of relative terms such as "up" and "down", and "left" and "right" is for convenience only and is not intended to be limiting.

BRIEF DESCRIPTION OF THE DRAWINGS

FIG. 6 is a cross-sectional view of another preferred embodiment of a junction box according to the invention;

FIG. 7 is a cross-sectional view, similar to FIG. 6, of a still further preferred embodiment of a junction box according to the invention that has a supplemental support;

FIG. 16 is a portion of the preferred embodiment of FIG. 15;

FIG. 17 is a side view of FIG. 16;

FIG. 18 is a partial cross-sectional view of FIG. 17, in use;

FIG. 19 is a partial cross-sectional view of FIG. 18;

FIG. 22 is a cross-sectional view of another preferred embodiment of a junction box according to the invention;

FIG. 23 is a cross-sectional view of a further preferred embodiment of a junction box according to the invention;

FIG. 41 is a sectional view of a preferred embodiment of a junction box according to the invention;

FIG. 42 is a sectional view of a preferred embodiment of a junction box according to the invention;

FIG. 43 is a sectional view of a preferred embodiment of a junction box according to the invention;

FIG. 44 is a sectional view of a preferred embodiment of a junction box according to the invention;

FIGS. 45–48 illustrate various views of yet another preferred embodiment of a junction box according to the invention;

FIGS. 49–51 illustrate another preferred embodiment of a junction box according to the invention; and FIGS. 52–53 illustrate a still further preferred embodiment of a junction box according to the invention.

DESCRIPTION OF THE PRIOR ART

Figure 1:
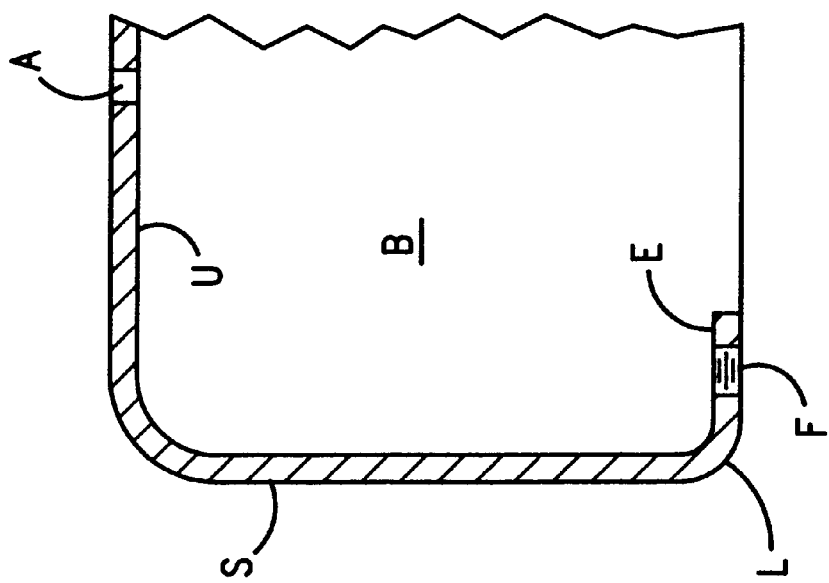
FIG. 1 is a cross sectional view of a PRIOR ART electrical junction box having an inwardly extending ear E with a faceplace plate attachment hole F provided therein.
Figure 2:
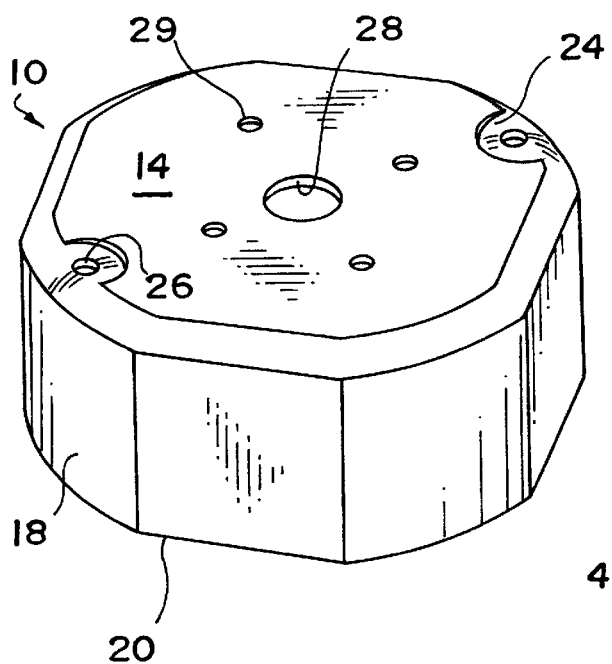
FIG. 2 is a top perspective view of a preferred embodiment of an electrical junction box according to the invention having dimples in a top wall thereof; prior to addition of a supplemental support.

FIG. 1 shows a PRIOR ART junction box including a side wall S, an upper wall U, and an ear E extending from a lower portion L thereof.

Upper wall U has one or more attachment holes A through which fasteners will be inserted for attaching PRIOR ART electrical box B to an overhead surface, such as to a ceiling joist or piece of plywood extending therebetween.

A lower, faceplate attachment hole F is typically provided in inwardly extending ear E. Frequently, faceplate hole F is provided with threads for mating with respective faceplate fasteners when securing an unillustrated faceplate thereto. Such faceplates are used to enclose electrical box B after the wiring inside the electrical box/junction box B has been completed.

A drawback of such PRIOR ART electrical boxes B is that they are typically made with stamped sheet metal extensions E; consequently, extensions E are relatively thin (i.e., in the order of about 1 millimeter or less). Such extension or ear E has a width of only a few millimeters, and only extends several millimeters inside box B. Thus, the surface area of ear E, when viewed from below after installation of upper wall U against a typical horizontal ceiling, is often substantially less than one centimeter squared (1 $cm^2$).

Consequently, ear E may only carry relatively small vertical loads, when installed against the ceiling, as described above.

As a result, local codes frequently allow such PRIOR ART boxes B to be used only for supporting the weight of a faceplate, or of a relatively light static load, such as a small light fixture.

Such electrical boxes B are unsuited for supporting large static loads, as well as for supporting large dynamic loads, such as ceiling fans which may weigh twenty-five kilograms or more (25 kg).

Thus, there is a need for an electrical box which is suited for carrying relatively large static loads as well as dynamic loads.

That need is especially clear, given that many homeowners want to install heavier light fixtures and dynamic loads, such as ceiling fans, than had exhibited such preferences in the past.

Furthermore, even if the initial owner/builder of a house or commercial space provides PRIOR ART load-carrying junction boxes B suited for carrying the vertical force of a small light fixture, a subsequent owner/user will often replace the original light fixture with a heavier light fixture, or with a dynamic load; i.e. a ceiling fan.

Accordingly, there is a need for a load-carrying junction box which is suited for a wide range of static and dynamic loads and, thus, suited for original installation in new construction, given that some users fail to upgrade load-carrying junction boxes when adding heavier static and/or dynamic loads to the box.

The electrical box according to the invention has overcome these drawbacks described immediately above, and has achieved the objects of the invention detailed above. Such will be evident when reading the following detailed description of the invention.

DETAILED DESCRIPTION OF THE INVENTION

Turning to FIGS. 2–5, a first preferred embodiment of an electrical box and/or junction box 10 according to the invention will now be described in detail.

Junction box 10 includes a top wall 14, and a side wall 18 extending downwardly therefrom and defining a cavity therein. Side wall 18 includes a lower free edge 20.

One or more dimples 24 may be provided on top wall 14, for example. Typically, at least one hole 26 will be provided in the dimpled region for receiving a fastener therethrough. A lower face 27 of dimple 24 assists in positioning of a supplemental fixture support 30, as described in detail below.

Additional holes, such as a hole 28, for receiving portions of an electrical fixture or wiring, for example, and/or holes 29 for receiving fasteners which secure junction box 10 to a ceiling, for example, may be provided.

Supplemental support 30 may be provided for increasing the holding strength of junction box 10.

Supplemental support 30 may be made with a height substantially equal to the distance between lower free edge 20 and lower face 44 of top wall 14.

Further, supplemental support 30 may have an inner or right side 31, a threaded hole 32, an upper portion 36, and a lower portion 38, each of which is described in detail below.

Figure 5:
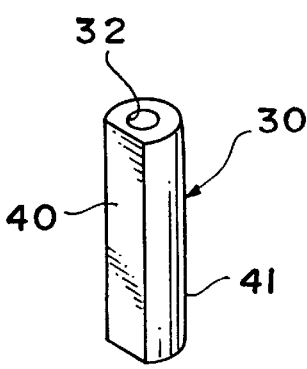
FIG. 5 is a top perspective view of a supplemental support for use with the embodiment of FIG. 2.
Figure 3:
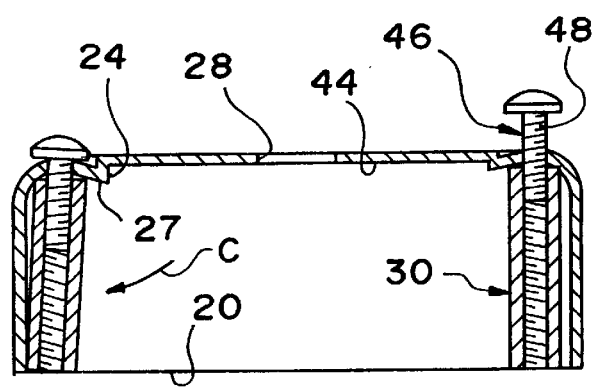
FIG. 3 is a cross-sectional view of the preferred embodiment of FIG. 2 showing the use of fasteners to secure supplemental supports to the junction box.

When increased resistance to inadvertent turning of supplemental support 30 about the longitudinal axis of fastener 46 is desired, supplemental support 30 may be provided with a face 40 configured for engaging with a portion of side wall 18 for restricting rotation of supplemental support 30. As shown in FIG. 5, configured face 40 may be made as a flat face. The non-configured exterior face of supplemental support 40 may be made as a rounded face 41, as shown.

Good results have been achieved when a threaded hole 32 is provided extending at least partially through supplemental support 30. Preferably, threaded hole 32 has threads selected to mate with those of fasteners 46.

Figure 4:
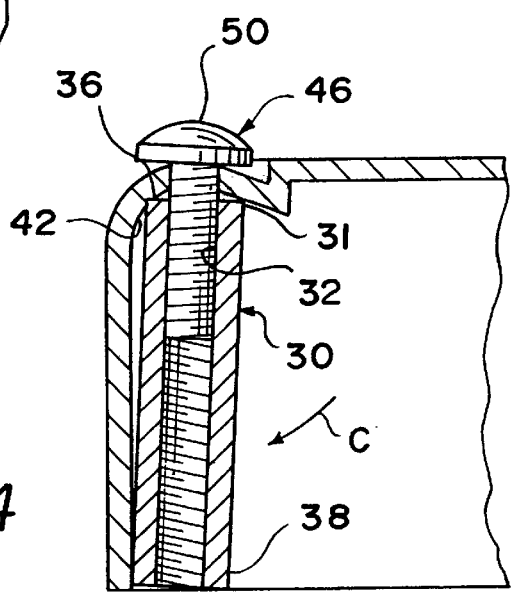
FIG. 4 illustrates a dimple of the embodiment of FIG. 2, by showing a portion of FIG. 3 on an enlarged scale.

Supplemental support 30 may be attached to box 10 by use of a powered screwdriver driving (i.e., turning) fastener 46 into threaded hole 32 by use of a screwhead 50. The threads of threaded hole 32 may extend all the way through support 30, as shown in FIG. 4, for example, so that an additional, unillustrated fastener for attaching a light fixture or ceiling fan, for example, may be attached to supplemental support 30 and, hence, to electrical box 10, from below during use.

It is likewise contemplated that threads 32 will be provided at the top portion of support 30, or at the bottom portion of support 30, or at both top and bottom portions with an unthreaded region in between.

Still further, it is expected that the threads 32 for mating with fastener 46 may be of a different size than the threads provided for mating with the fasteners which attach the ceiling fan or light fixture to the lower portion of support 30 when in use.

Support 30 may have a variety of external configurations as well, such as being a full, cylindrical shape with no flat face 40, a hexagonal supplemental support 30, a triangular supplemental support 30, and other configurations which achieve the objects of the invention.

Good results have been achieved when an upper portion 36 of supplemental support 30 engages lower face 27 of dimple 24. In that manner, support 30 may be located substantially adjacent to sidewall 18, so that sidewall 18 also assists in prevention of further outward movement of support 30 that might lead to a loosening of the connection between fastener 46 and top wall 14, and undesirable loosening of the support 30 relative to box 10.

Specifically, upper portion 36 of support 30 abuts lower face 27 of dimple 24 during assembly of box 10. When fastener 46 is tightened and draws support 30 into engagement with lower face 27, the right side or inside 31 of upper portion 36 contacts lower face 27 and causes support 30 to rotate in the direction of arrow C; i.e., clockwise, as viewed in FIGS. 3 and 4, for example so that the lower portion 48 of support 30 engages side wall 18. Thanks to the dimpled region 24, the lower portion 38 moves toward wall 18, rather than away from wall 18 as would happen if no dimpling were present and upper portion 36 contacted radiused region 42, as in a conventional electrical box.

When two supports 30 are attached to the left and right ones of holes 26, placement of support 30 yields the added benefit of achieving a standard center-to-center spacing between respective threads 32 of each of the two supported supports, even when using a "standard" box forming equipment for making a standard box size, as discussed in greater detail below. Such also has the benefit of allowing use of standard equipment for forming holes in a sheetrock ceiling for receiving the box, while maintaining the standard 3.5 inch fixture support.

It will be appreciated that the preferred embodiment of FIGS. 2–5 yields a solution to the problems set forth in the previous pages. For large-scale production, a powered screwdriver can be used to assist in this major breakthrough by attaching support 30 to the wall of the electrical box 10.

FIG. 6 illustrates a yet still further preferred embodiment of a junction box 60 that allows a support 64 to be installed in the radius of the box by stamping or dimpling a portion of the steel box, i.e., providing dimple 24 as described above. In that manner, a lower portion 68 of the support stud 64 abuts the lower inside face of box 60.

During assembly of the embodiment of FIG. 6, support 64 is inserted through a hole in top wall 14, then support 64 is attached to top wall 14 by use of a hand-operated or automatic screwdriver by use of head 50. Such tightening of support 64 causes the tight engagement of lower face 27 of top wall 14 and upper portion 66 of support 64, and, hence pushes lower portion 68 against the inside of box 60.

In use, a fastener or screw 70, typically provided with the ceiling fixture, is attached to and supported by junction box 60 by use of screws 70 attached to female threads and inserted in the direction of an arrow 78.

FIG. 7 shows another preferred embodiment of a junction box 90 according to the invention.

Box 90 has a support 84 with an upper portion 94 and a stepped-down portion 98 at a lower portion thereof. Stepped-down portion 98 provides for even more room in junction box 90 for wires and the like to be located. As in the other embodiments, female threads may be provided on stepped-down portion 98. Support 94 is pressure fitted onto box 90, and engagement of flange 88 of stud 84 with the upper face of dimpled portion 24 ensures that stud 84 maintains desired spacing with or moves into engagement with sidewall 18; i.e., moves into the desired position. The illustrated friction surface in the upper region of support 94 may be a roughened surface or may include fluting as described in detail below regarding FIGS. 8 and 9 and may be provided for preventing movement of support 94 relative to the remainder of box 90.

Junction box 90 includes a piece of double-sided tape 100 on top wall 14 thereof. Double-sided tape 100 may be provided with a protective strip or layer 104 on the outer face thereof, i.e., on the face of double-sided tape 100 that has not been adhered to junction box 90. Conventional double-sided tape 100 may be used.

Alternative means for adhering junction box 90 to a surface may be used, such as spray-on adhesive, a piece of putty and other adhering means, such as described in my earlier U.S. patent application Ser. No. 08/490,757, filed Jun. 15, 1995, and Ser. No. 08/371,695, filed Jan. 12, 1995, each of which is incorporated herein by reference, may be utilized in conjunction with or instead of the double-sided tape 100.

One of the many advantages of junction box 90 is that the user may remove protective layer 104, and then adhere double-sided tape 100 to the surface to which junction box 90 is to be attached. Double-sided tape is selected and sized so that sufficient holding power for temporarily adhering junction box 90 to the surface is achieved, while the user has both hands free for permanently attaching junction box 90 in the desired location by nails (or shooting screws) through one or more holes 29 in the top wall 14.

Preferably, the adhesive is sufficiently strong to adhere box 90 to a horizontal surface located above the user's head.

The thickness of double-sided tape 104 is coordinated with the thickness (i.e., height) of flange 84 of stud 84 so that each performs its intended function.

In a like manner, the height of the external portion of other illustrated supplemental supports will be coordinated with the thickness of adhesive material or double-sided tape 100. Specifically, when screw 46 and screwhead 54 of the embodiment of FIG. 6 are used with junction box 90, the thickness of double-sided tape 100 must be selected to be at least as high, and preferably in most cases, higher than the height of screwhead 50.

Alternatively, when attaching box 90 to a stud or ceiling joist having a width less than distance between left and right flanges 88, double-sided tape 100 need not extend away from top wall 14 a distance greater than the height of flanges 88. That is because the stud or joist would fit in between the offset left and right flanges 88.

Figure 8:
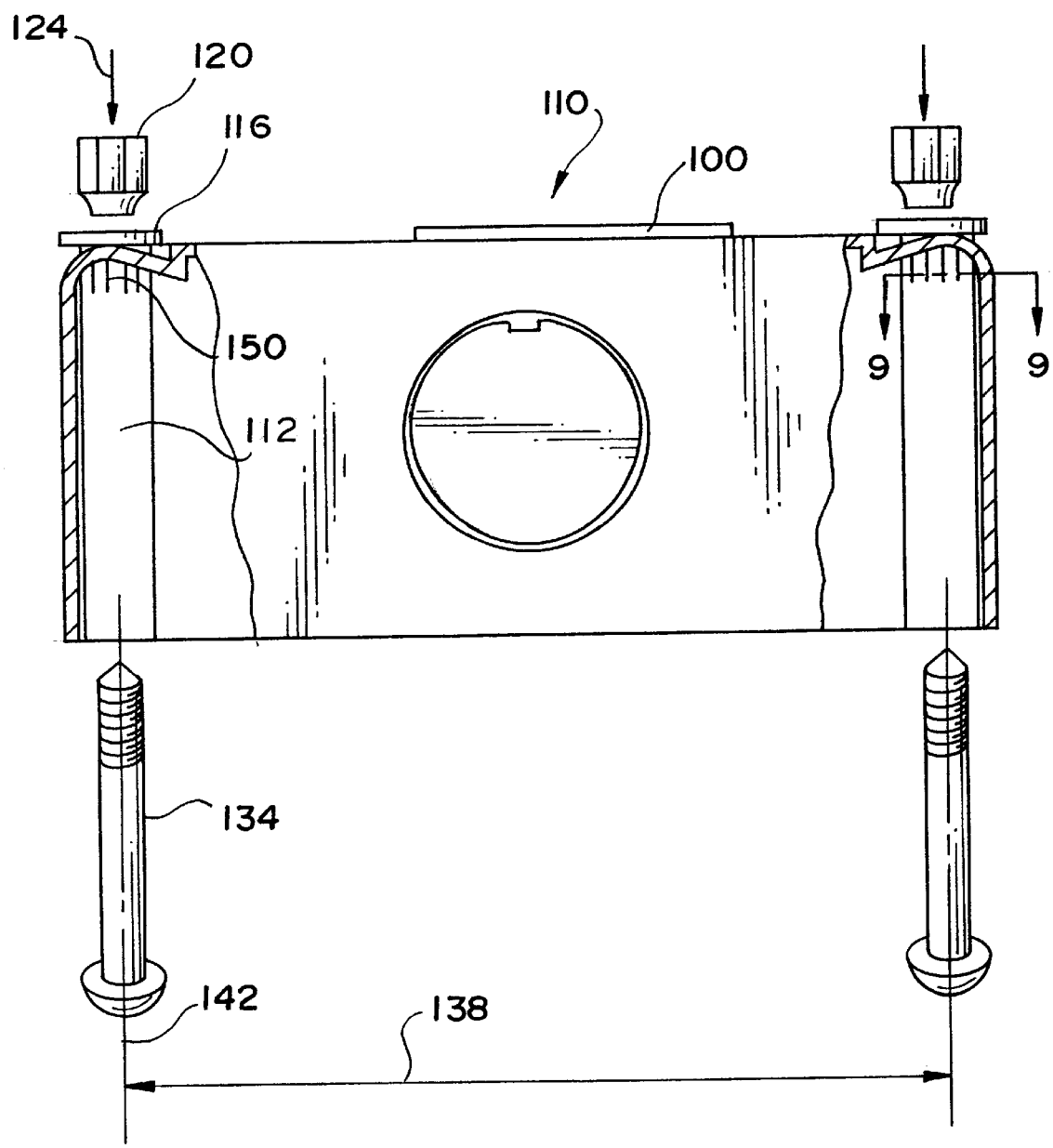
FIG. 8 is a cross-sectional view of yet another preferred embodiment of the invention, having a piece of double-sided tape on the top wall thereof for easing installation thereof.

The preferred embodiment of a junction box 110 illustrated in FIG. 8 includes a top wall 14 having dimples 24.

Any of the above-described supplemental supports, such as the illustrated support 84 or equivalents, may be used with junction box 110.

Flanges 116, and flanges 88 of the FIG. 8 embodiment, are particularly suited for restricting rocking movements of studs 94 and 112, respectively; i.e., restricting movement of supports 94 and 112 within a vertical plane defined by the two (2) illustrated studs of FIG. 8. One may consider a function of flanges 116 (and 88) to include serving as built-in washers for strengthening the connection between the supports and top wall 14 of the respective junction boxes 90 and 110.

It will be appreciated that restricting the tendency of the supports to move within a vertical plane helps maintain the integrity of the initial connection between the supports and junction boxes 90 and 110; e.g., the connection between top walls 14 and the supplemental supports.

Still further, restricting such tendency of the supports to rotate within a vertical plane helps to ensure that supports 94 and 112 extend substantially parallel to side wall 18 of their junction boxes 100 before and during use. Needless to say, all those aspects of fine-tuning of the connection between the supplemental support and the remainder of the junction box are geared for achieving predictability of where the lower threaded portions of the supports are.

Needless to say, the disclosed connections and configurations act to restrict all movements between supports 94 and 112 and the remainder of the respective boxes 90 and 110. The above discussion regarding restriction of movement within a "vertical" plane is merely an example.

By restricting movement of the supplemental supports, there is achieved the desired predictability of where the lower portions of female threads on 98 and 112 are located so that the desired spacing between a left hand supplemental support and a right hand supplemental support is achieved. Typically, the spacing between the commonly provided two (2) female fasteners 134 (i.e., left and right ones) attached to and extending from left and right ones of supports 112 will be achieved. Known light fixtures, for example, are provided with respective left and right male fasteners 134 (and 70), about 3.5 inches (3.5 in.) on center, which will be mated with such left and right female fasteners during final use of the illustrated junction boxes.

Preferably, a lock nut 120 cooperates in the attachment of stud 112 to dimple 24. Good results have been achieved when lock nut 120 was pressure fit into the stud 112 that had been drawn through the corresponding aperture in dimple 24. Lock nut 120 is pressure fit in the direction 124.

Lock nut 120 may be provided with female threads. In that case, box 110 may be assembled at the factory by attaching stud 112 to dimple 24 and lock nut 120. The user can then use illustrated fasteners 134 for attaching a ceiling fixture to box 110; i.e., to the female threads of lock nut 120.

As in the other embodiments, a distance 138 between respective center lines 142 of fasteners 134 may be set at a standard distance that corresponds to an industry standard for light fixtures, ceiling fans, and the like. Currently, a standard industry distance 138 is about 3.5 inches (3.5 in.).

All the advantages described regarding the stabilizing of supplemental supports of FIGS. 7 and 8 relative to the remainder of their respective junction boxes hold true for all the other preferred embodiments of the invention.

Good results have been achieved when extensions and/or knurling and/or roughened surfaces and/or a friction surface 150 are provided on an upper portion of support 112. When 150 is in the form of roughened surfaces, such roughened surfaces should be sufficiently roughened so as to engage one or both corresponding holes extending through top wall 14.

Figure 9:
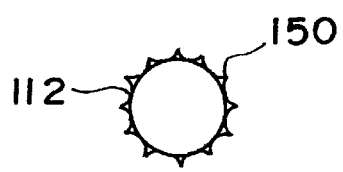
FIG. 9 is a cross-sectional view of a portion of the preferred embodiment of the junction box of FIG. 8.

FIG. 9 illustrates an exaggerated cross-sectional view of the extensions 150 of support 112.

As to supplemental supports, such as the illustrated supports 30, 60, 90 and 110, it is likewise contemplated that such supplemental supports will have fully round cylindrical shapes, hexagonal-shapes, square shapes, shapes which are tapered at an upper portion thereof (i.e., shapes that have the appearance of truncated cones, and truncated pyramids). In addition, frustrums of pyramids and the other shapes are contemplated with truncation taken at angles other than the illustrated substantially 90° angle between the top face of respective supplemental supports 30, 60, 90 and 110 that contacts the lower face 44 of upper wall 14 of the various preferred embodiments of the junction box according to the invention.

It is expected that locking coupling nuts will be used to attach supplemental supports to variations of the illustrated embodiments to the junction box, as in the FIG. 8 embodiment, as well as any other means of fastening supplemental supports to the junction box in a sufficiently secure manner so as to achieve the objects of the invention.

Figure 10:
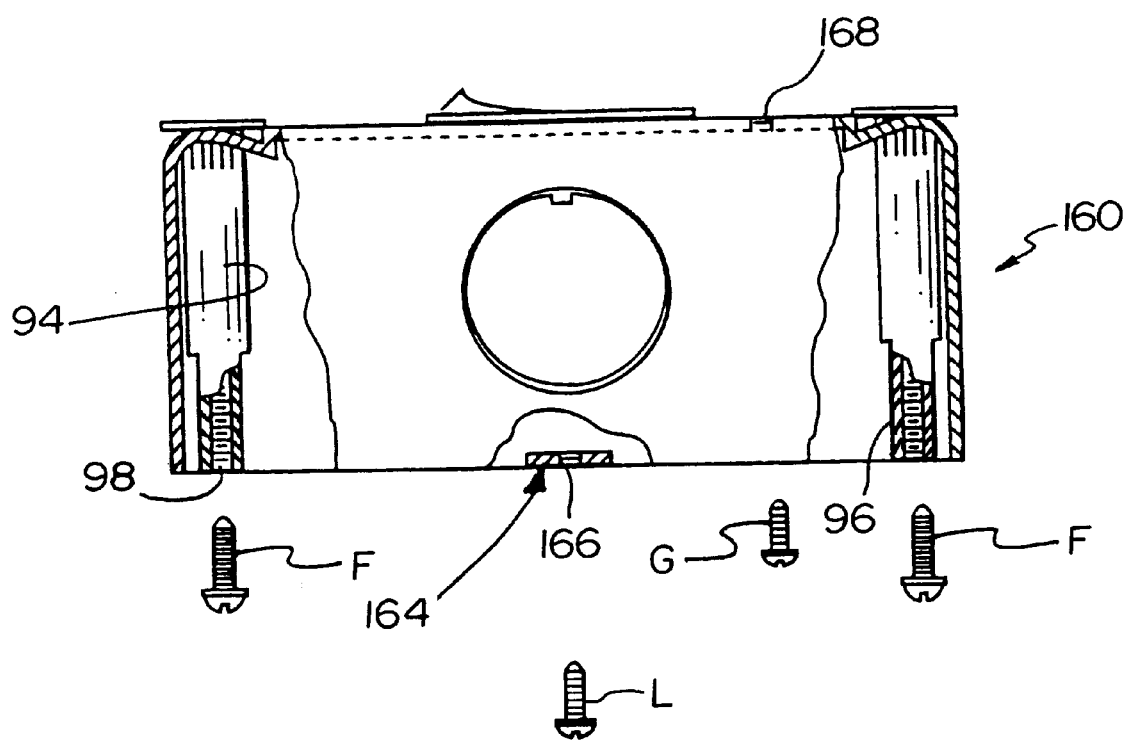
FIG. 10 is a cross-sectional view of another preferred embodiment of a junction box according to the invention.

FIG. 10 shows another preferred embodiment of a junction box 160 according to the invention.

Junction box 160 may include fixture support 94 having a reduced portion 96 in which female threads 98 are provided, as in the embodiment of FIG. 7. Threads 98 may be sized for receiving a fastener F of the type used for securing ceiling fans, chandeliers, and other relatively heavy fixtures to box 160.

One or more ears 164 having threads 166 thereon may be provided. Threads 166 may be sized for receiving a further fixture fastener L of the type used for securing relatively light electrical fixtures, such as lights, and even switches and face plates. Ears 164 may extend inwardly into the cavity of junction box 160, as shown, or outwardly of the cavity, depending on the intended use. Ears 164 may be formed such as by the bending of a stamped out extension extending from a portion of the side wall of box 160, and then forming female threads 166 therein, as will be readily appreciated.

One or more further threaded holes 168 may be provided on box 160, such as in the top wall thereof, as illustrated. Threads 168 may be sized for receiving a grounding screw G of the type typically used for securing a ground wire to the junction box.

Figure 11:
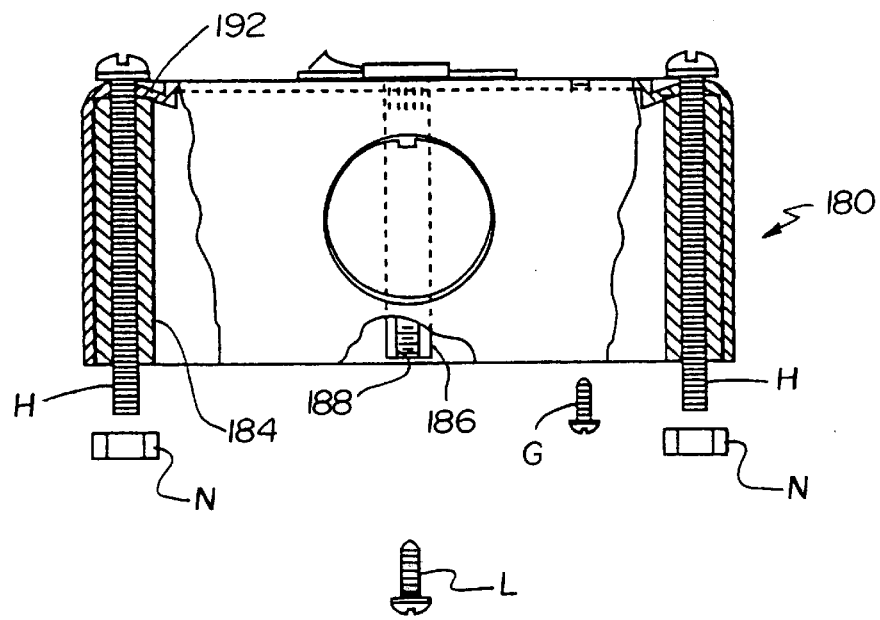
FIG. 11 is a cross-sectional view of a further preferred embodiment of a junction box according to the invention.

FIG. 11 is illustrates another preferred embodiment of a junction box 180 according to the invention. Junction box 180 may include one or more fixture supports 184 of a first type, and one or more fixture supports 186 of a second type. Supports 186 may be provided with internal threads 188 sized for mating with fasteners L.

Fixture support 184 may have internal threads or not, depending on the intended use. In the case where supports 184 have internal, threads, the threads of fasteners H will be sized to mate therewith.

In that manner, during assembly of junction box 180, fasteners H may be inserted through the respective dimples 192, and then the threads on fasteners H will mate with the corresponding internal threads on supports 184. In that manner, the tightening of fastener H with respect to support 184 will cause dimple 192 to be clamped therebetween; and, hence, support 184 and fastener H will be drawn toward/tilted toward the side wall of junction box 180 for engagement therewith.

As in the above described embodiments, the engagement of support 184 with the side wall of box 180 not only enhances the strength of box 180, but also ensures that the lower end of fastener H is located at the expected position for being secured to an electrical fixture during use. During use, a nut N may be threaded onto fastener H for securing the fixture thereto. As illustrated, fastener H may extend outwardly of junction box 180.

Threads 188 of fixture support 186 may be 8–32 threads, and the threads of fastener H may be 10–32 threads for receiving a corresponding 10–32 nut N, which may be the nut provided with the electrical fixture, for example. Fastener H may extend outwardly of box 180, as shown.

Figure 12:
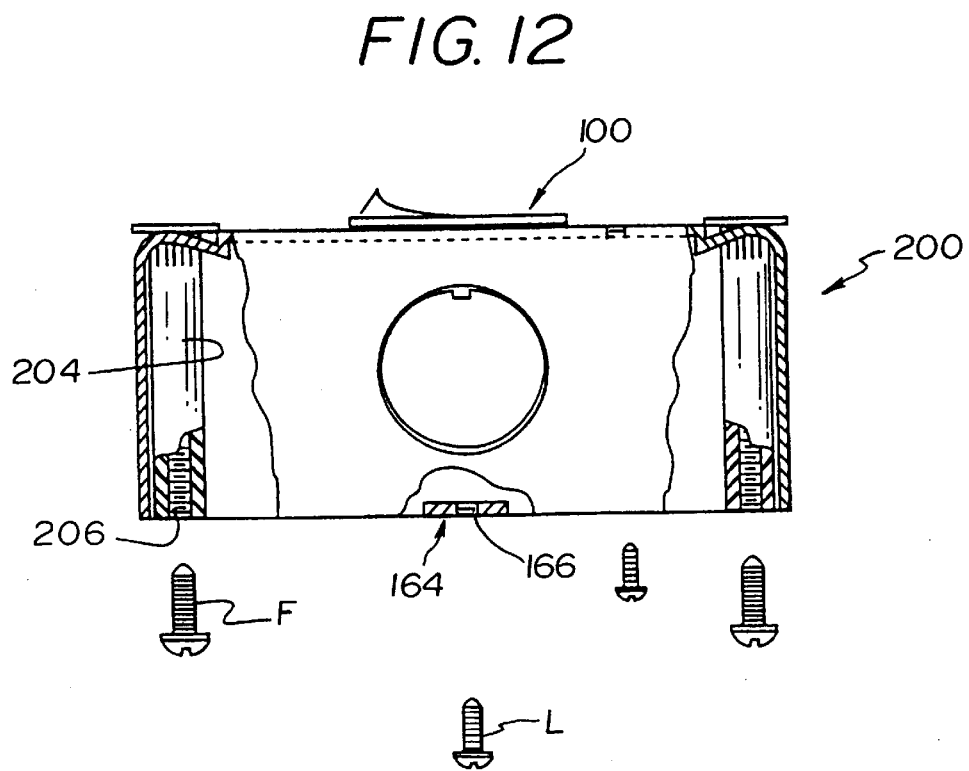
FIG. 12 is a cross-sectional view of another preferred embodiment of a junction box according to the invention.

FIG. 12 shows another preferred embodiment of a junction box 200 according to the invention.

Junction box 200 includes fixture support 204 having threads 206, which may be provided at a lower portion thereof and sized for receiving fastener F. Box 200 may likewise be provided with one or more ears 164 having threads 166, as described regarding junction box 160 of FIG. 10 above.

Box 200 differs from box 160 as supports 204 lack reduced portion 96 of the fasteners 94 of the FIG. 10 embodiment. Again, box 200 provides for two (2) boxes in one, and typically will provide for alternately, the supporting of a heavy fixture by the use of fasteners F or light fixture by the use of fasteners L. As in the above described above embodiments, double-sided tape 100 may be provided for at least temporally securing box 200 to a support surface.

Figure 13:
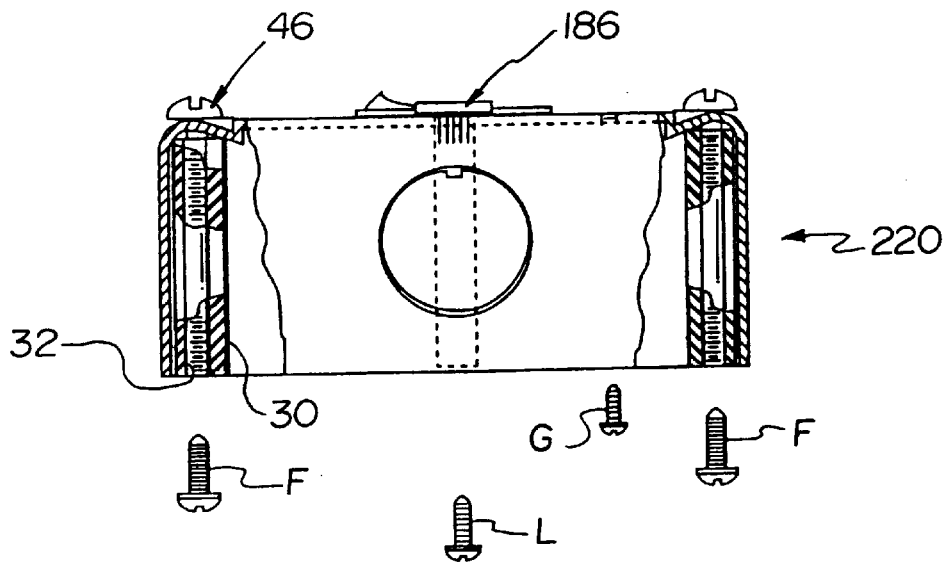
FIG. 13 is a cross-sectional view of a further preferred embodiment of a junction box according to the invention.

FIG. 13 illustrates another preferred embodiment of a junction box 220 according to the invention. Box 220 may include one or more fixture supports 30 having threads 32, and which support 30 is secured to box 220 by the use of fasteners 46 as described in regarding FIG. 4 above. In addition, box 220 may include one or more fixture supports 186 as in the embodiment of FIG. 11.

In that manner, junction box 220 may be used, alternately, for supporting a first type of electrical fixture by use of fasteners F and a different electrical fixture requiring the use of fasteners L.

Figure 14:
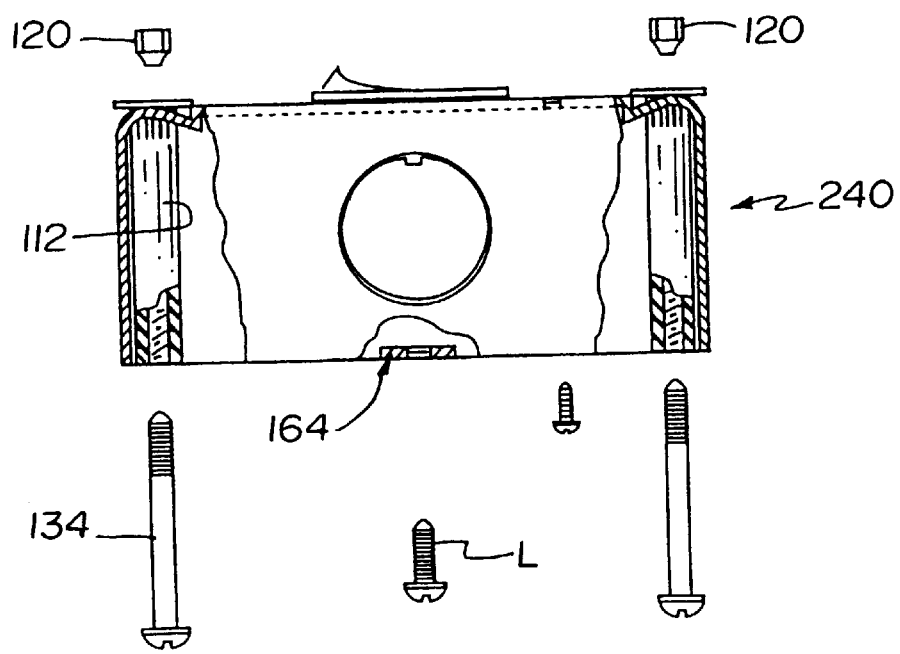
FIG. 14 is a cross-sectional view of another preferred embodiment of a junction box according to the invention.

FIG. 14 shows yet another preferred embodiment of a junction box 240 according to the invention. Junction box 240 may include one or more supports 112 secured to box 240 by the use of lock nuts 120, and then respective fasteners 134 will be used for attaching the electrical fixtures as described in connection with the embodiment of FIG. 8 above.

One or more ears 164 may be provided, and sized for securing fasteners L, as described regarding box 200 of FIG. 12.

FIGS. 15–19 show a preferred embodiment of a junction box 260 according to the invention. Junction box 260 includes one or more open wall cavities 262, which may open to the outside of box 260; i.e., cavities 262, as illustrated, do not open to the main cavity of box 260 defined by the side wall thereof.

One or more supports 204 having threads 206 of the type used in junction box 200 of FIG. 12 may be disposed in open wall cavity 262 and may engage a portion 263 of the top wall of box 260 that may or may not be dimpled for orienting support 204. Open wall cavity 262 may be further defined by a wall 264 which separates support 204 from the main cavity of box 260. In the case were top portion 263 is dimpled, the dimpling may be oriented so that support 204 tilts inwardly toward the main cavity of box 260 at a lower portion thereof. In that manner, fixture support 204 may abut side wall 264 and be more fixedly secured thanks to such abutment.

One or more further fixture supports 266 having fixture fasteners 268, such as the illustrated female fasteners, may be provided. Fasteners 268 may be sized for receiving a first type of fastener L, and fasteners 206 may be sized for securing a second type of fixture fastener F. In that manner, as in others of the preferred embodiments, the object of providing two (2) boxes in one is achieved.

A side support 270 may be provided for use when box 260 is to be attached to one of its sides. Side support 270 may include one or more holes 278 for receiving fasteners, such as rivets or screws, therethrough for attaching side support 270 to the remainder of box 260. One or more indicators 282 and 284 may be provided so that the installer has a reference gage for use in locating side support 270 and, hence, box 260, relative to a finished surface of a wall, for example. Size indicator 282 may be inset relative to a free edge 286 at a distance selected for use when half inch drywall or sheet rock is to be installed. Likewise, indicator 284 may be further offset and sized for use when 5/8 inch drywall is used.

One or more openings 288 may be provided on side mount 270. Opening 288 may include a split attachment support having a first extension 292 and a second extension 294 that cooperate to engage a fastener P. Extensions 292 and 294 may be sized and configured for holding fastener P securely enough so that the installer has both hands free for use in installing fastener P. In that manner, installation is speeded up and the installation of box 260 is simplified so that box 260 may be also quickly and accurately installed.

Figure 15:
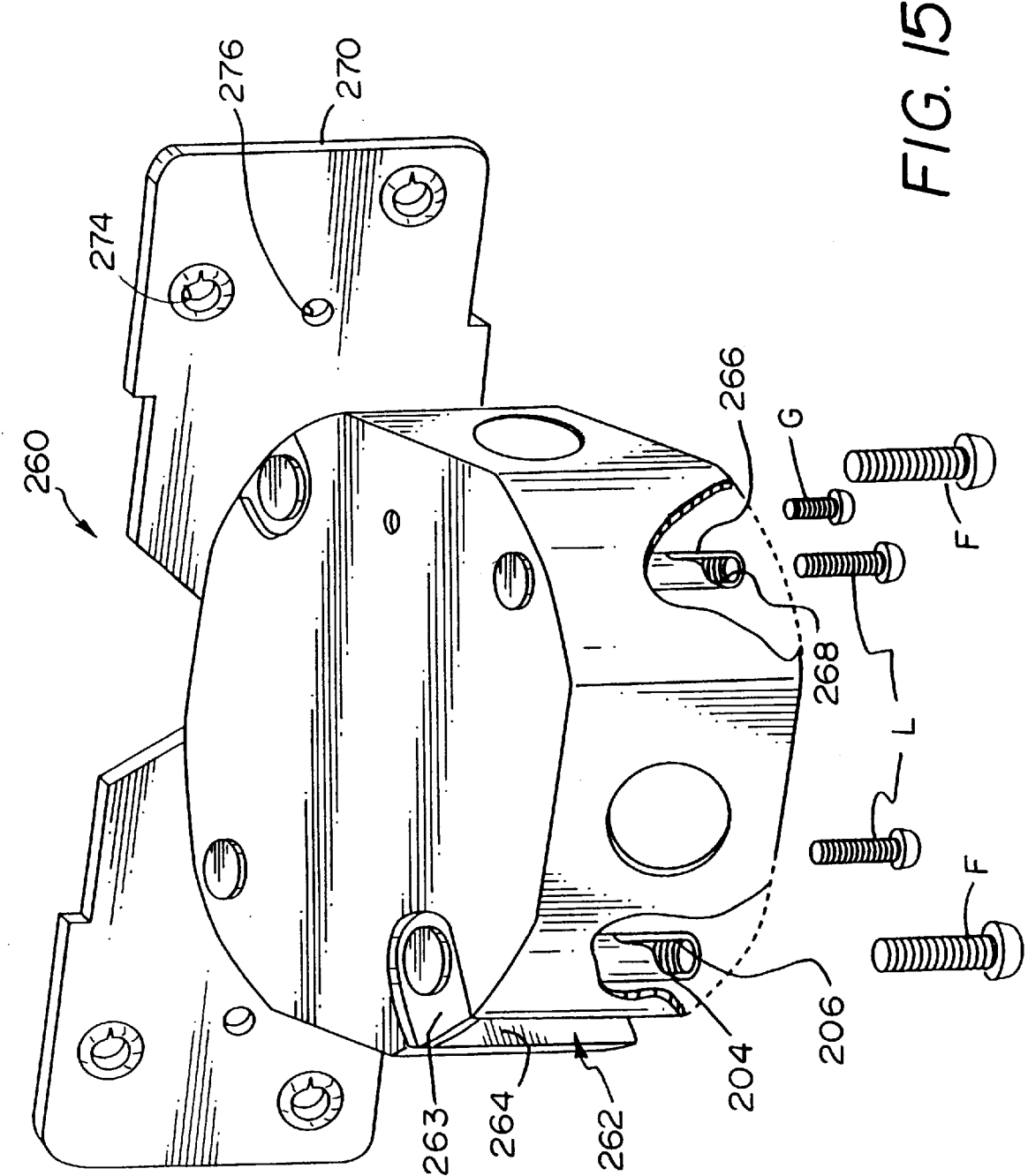
FIG. 15 is a perspective view of a further preferred embodiment of a junction box according to the invention.
Figure 20:
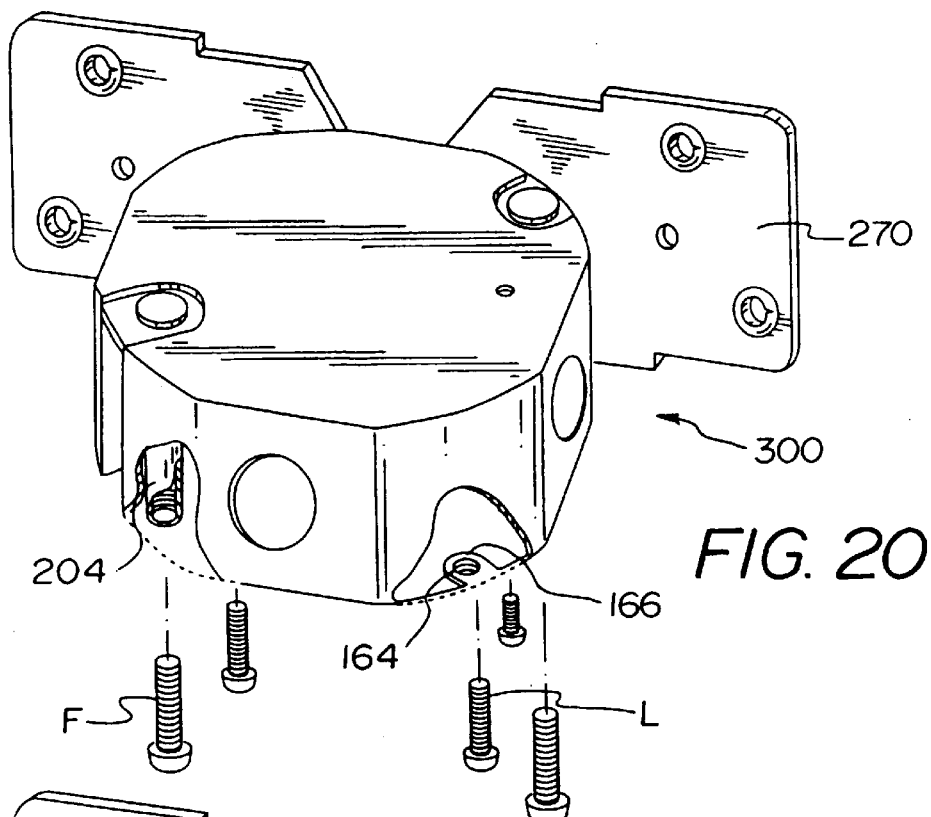
FIG. 20 is a view of another preferred embodiment of a junction box according to the invention.

FIG. 20 illustrates another preferred embodiment of a junction box 300 having mounting plate 270 and one or more fixture supports 204 of the type described regarding the embodiment of FIG. 15, for example.

Junction box 300 may likewise be provided with an ear 164, which may be inwardly extending as shown, and which may have threads 166, as in the embodiment of FIG. 14. In that manner, junction box 300 may be used for heavy duty applications when fixture supports 204 receive fasteners F; and, box 300 may be used for supporting the different type of fixture supports of the type secured by fasteners L, likewise as described above.

Figure 21:
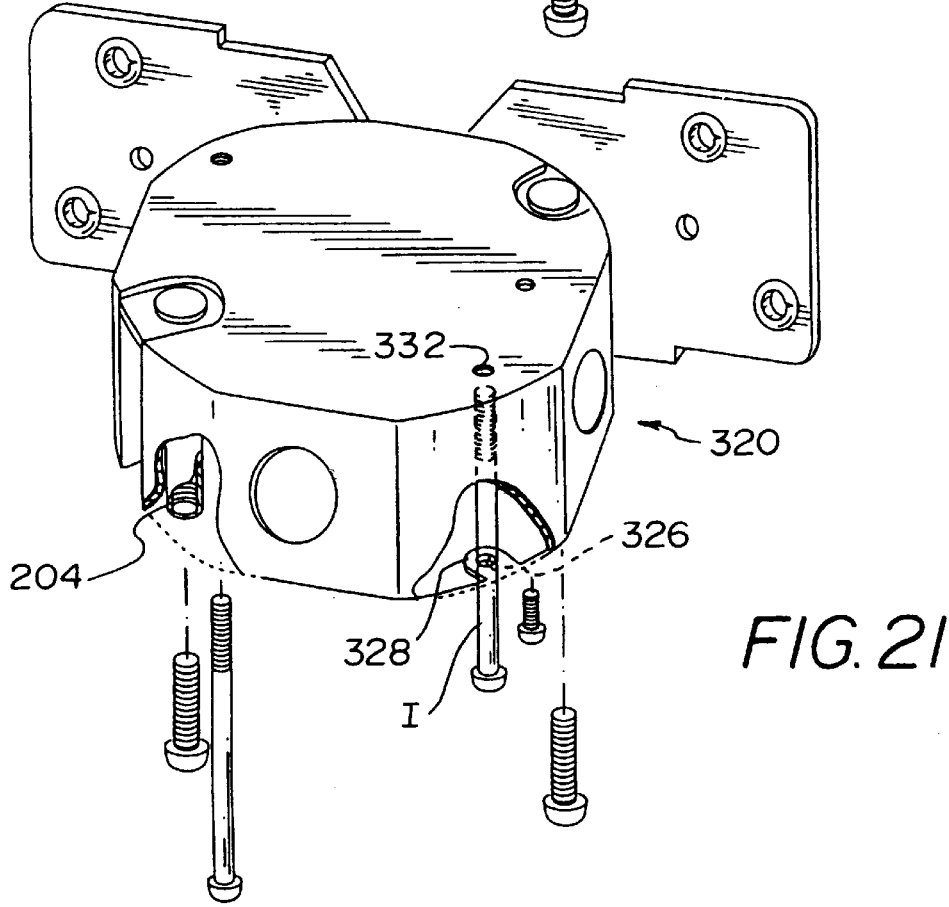
FIG. 21 is a view of a further preferred embodiment of a junction box according to the invention.

FIG. 21 illustrates a further preferred embodiment of a junction box 320 according to the invention.

Junction box 320 may include one or more fixture supports 204, as described above. In addition, box 320 may include an opening or hole 326 provided in an ear 328 extending away from the side wall of box 320. As shown, opening 326 may be an unthreaded hole.

A further opening 332, such as the illustrated threaded hole, may be provided in the top of box 320 and substantially aligned with hole 326. In that manner, a fixture fastener I may be inserted through hole 326 and into engagement with the threads of hole 332. When hole 326 is free of threads, it is faster to insert fastener I therethrough, for example. Opening 332 also may serve as a guide for installation of fastener I.

FIG. 22 shows another preferred embodiment of a junction box 340 according to the invention. Junction box 340 may include fixture supports 204 for securing the fasteners F, as described in connection with FIG. 12 above.

In addition, box 340 includes side mounting plate 270, as described in detail in connection with junction box 260 of FIGS. 15–19. As shown, junction box 340 is similar to junction box 260 of FIG. 15; however, fixture supports 204 are disposed inside the main cavity of the junction box 340.

FIG. 23 shows a further preferred embodiment of a junction box 360 according to the invention. Box 360 may include fixture supports 30 having threads 32, as described above, and may likewise be provided with side mounts 270.

Figure 24:
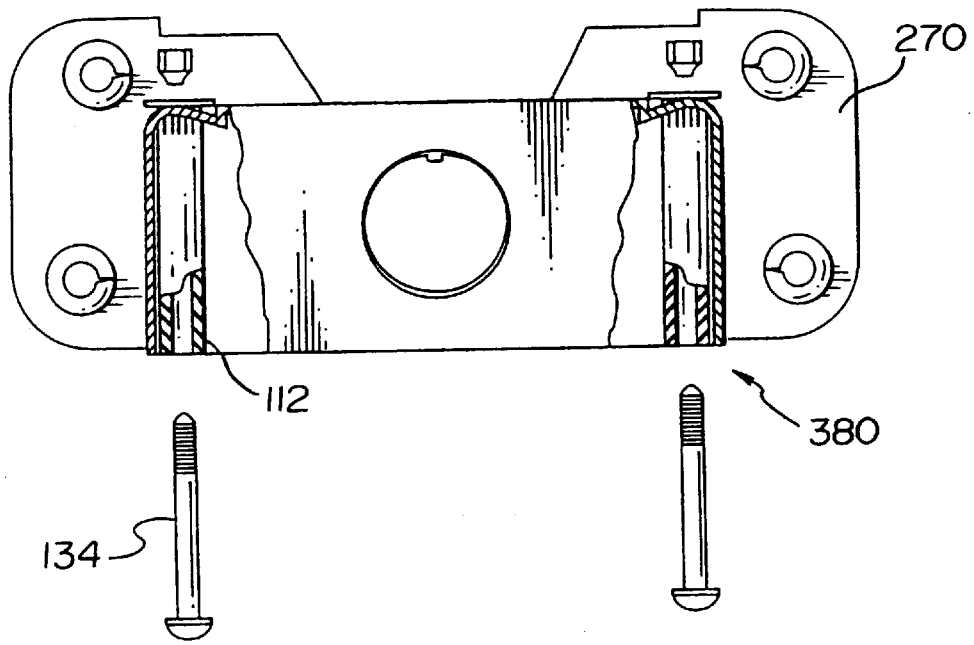
FIG. 24 is a cross-sectional view of a further preferred embodiment of a junction box according to the invention.

Turning to FIG. 24, another junction box 380 according to the invention is shown.

Junction box 380 includes fixture supports 112 for receiving fasteners 134 as described in connection with the embodiment of FIG. 14, for example. Side mount 270 may likewise be provided, as described above.

Figure 25:
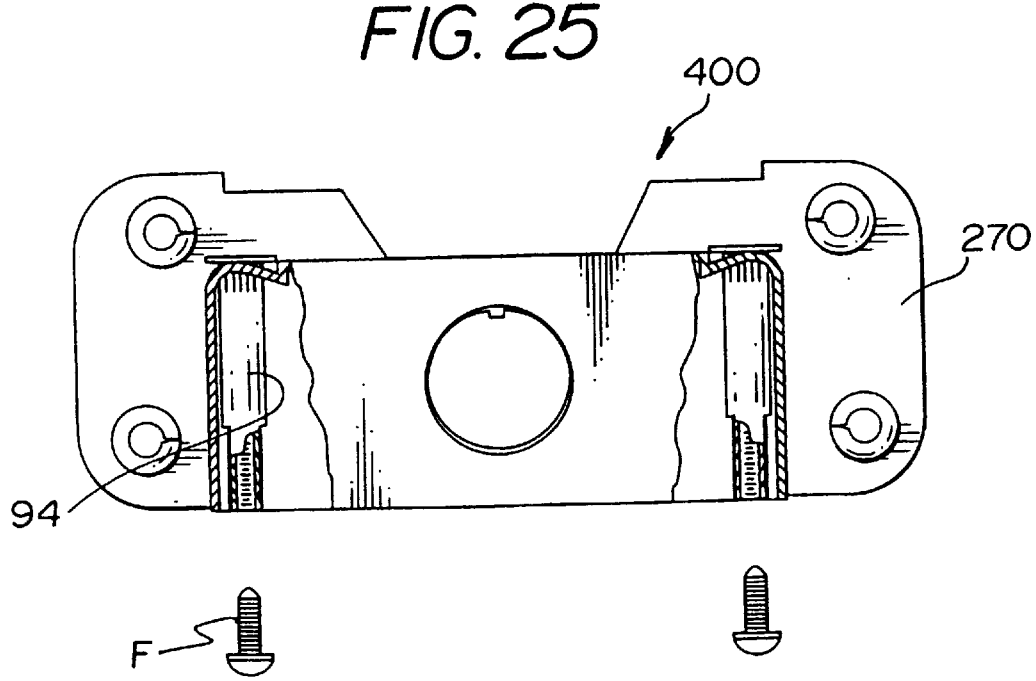
FIG. 25 is a cross-sectional view of another preferred embodiment of a junction box according to the invention.

FIG. 25 is a junction box 400 according to the invention that includes a stepped fixture support 94 sized for receiving fasteners F, as described regarding FIG. 10, and is similar to junction box 160 of FIG. 10, with the addition of side mount 270. As above, support 94 may be a wedged tubing stud for receiving 10–32 screws F.

Figure 26:
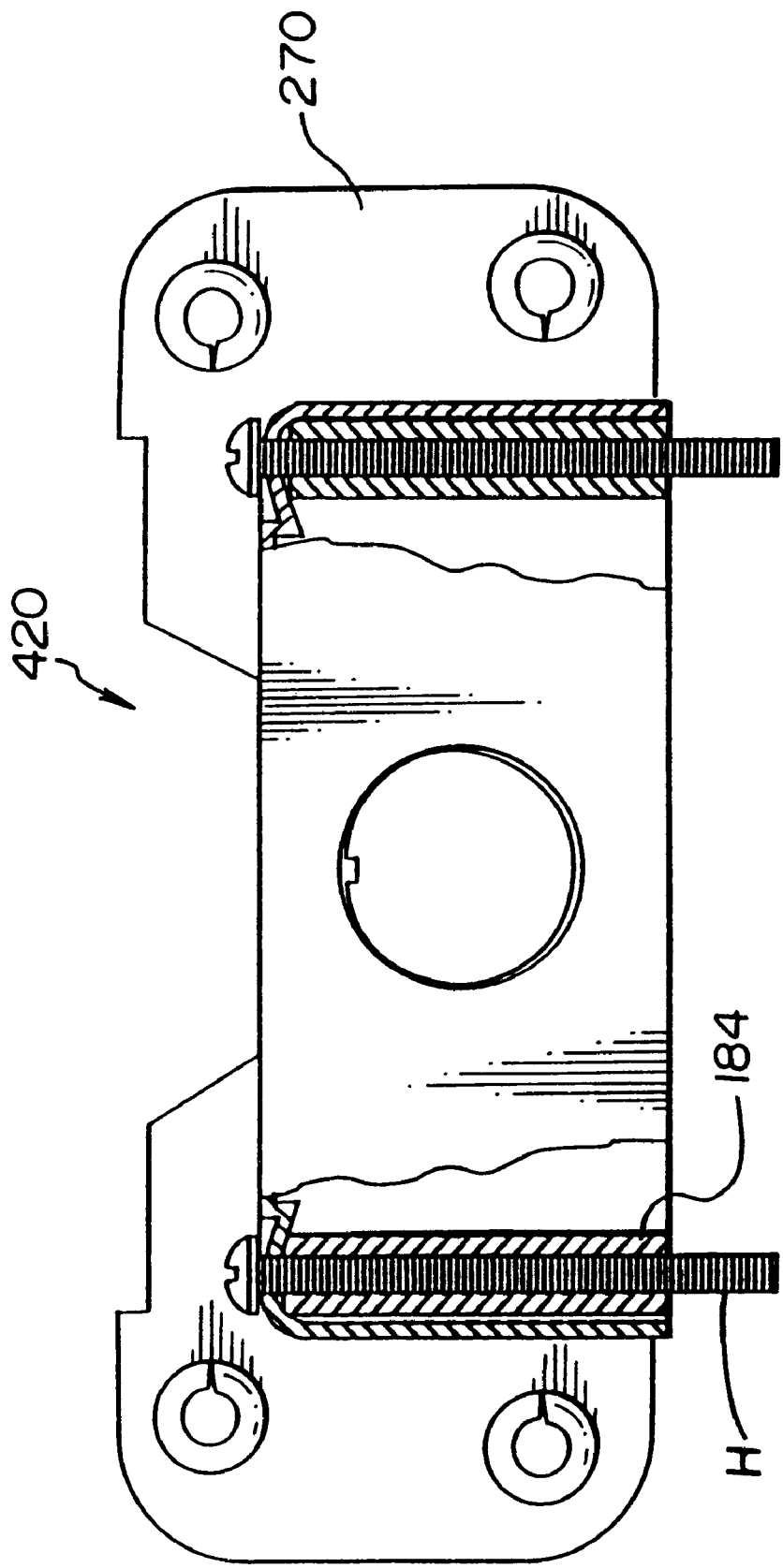
FIG. 26 is a cross-sectional view of a further preferred embodiment of a junction box according to the invention.

FIG. 26 shows a preferred embodiment of a junction box 420 according to the invention.

Junction box 420 may include fixture supports 184 for securing fasteners H that extend outwardly of the main cavity of box 420, as described regarding box 180 of FIG. 11.

Figure 27:
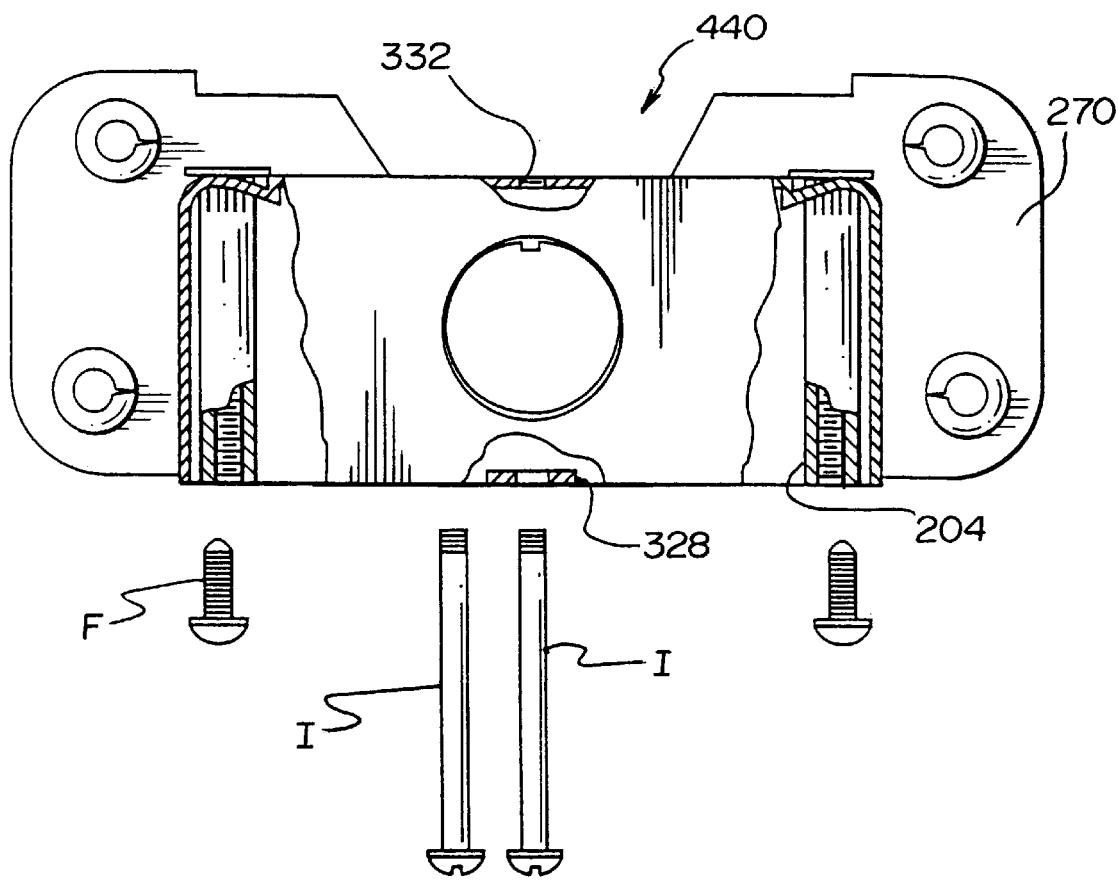
FIG. 27 is a cross-sectional view of another preferred embodiment of a junction box according to the invention.
Figure 28:
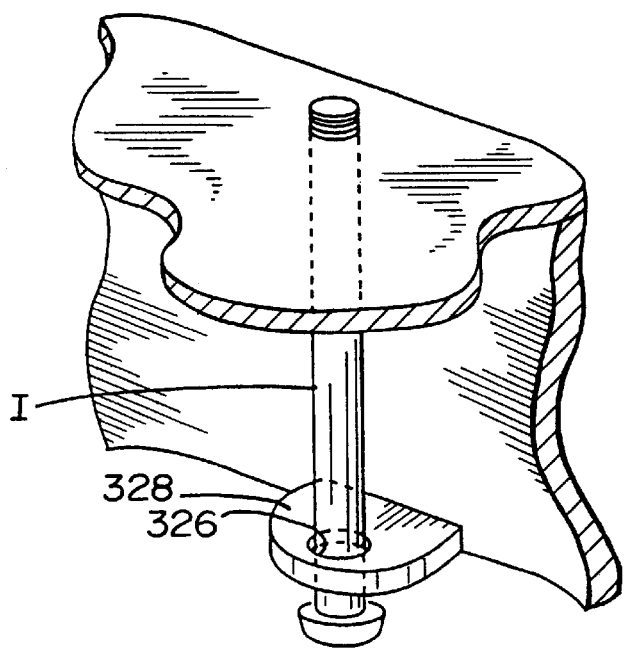
FIG. 28 is a partial cross-sectional view of FIG. 27.

FIGS. 27 and 28 show a junction box 440 according to yet another preferred embodiment of the invention.

Box 440 may include fixture supports 204, ears 328 having openings or guide holes 326 therein, and substantially aligned threaded holes 332, as described regarding box 320 of the embodiment of FIG. 21. As above, fasteners I may be substantially free of threads or other roughened surfaces that might abrade or wear the insulation wiring of insulation or plastic-coated wiring disposed in the main cavity of box 440 during use. Box 440 is similar to junction box 320 of the embodiment of FIG. 21, yet fixture supports 204 are disposed within the main cavity of box 440. Although supports 204 are disposed within the main cavity, the outer surfaces of supports 204 will typically be sufficiently smooth so as to avoid abrading insulation or plastic or wiring of wiring disposed within the main cavity during use, as discussed above.

Figure 29:
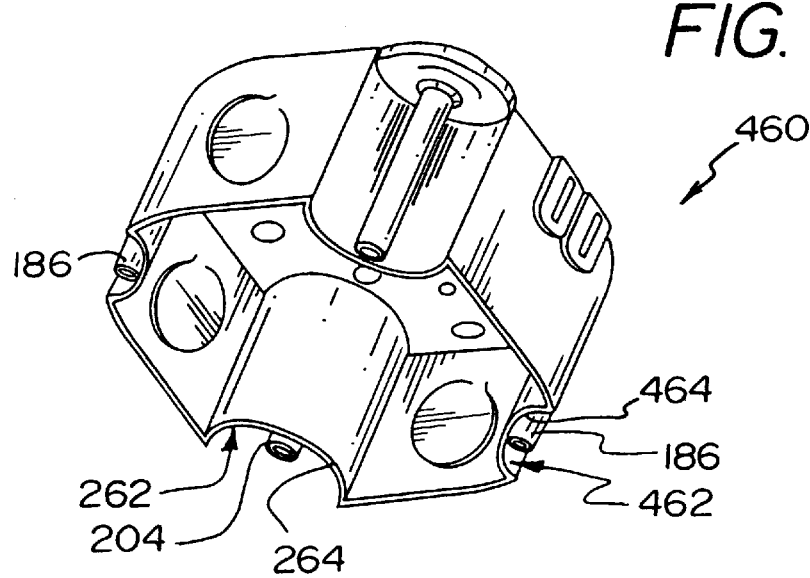
FIG. 29 is a view of a further preferred embodiment of a junction box according to the invention.
Figure 30:
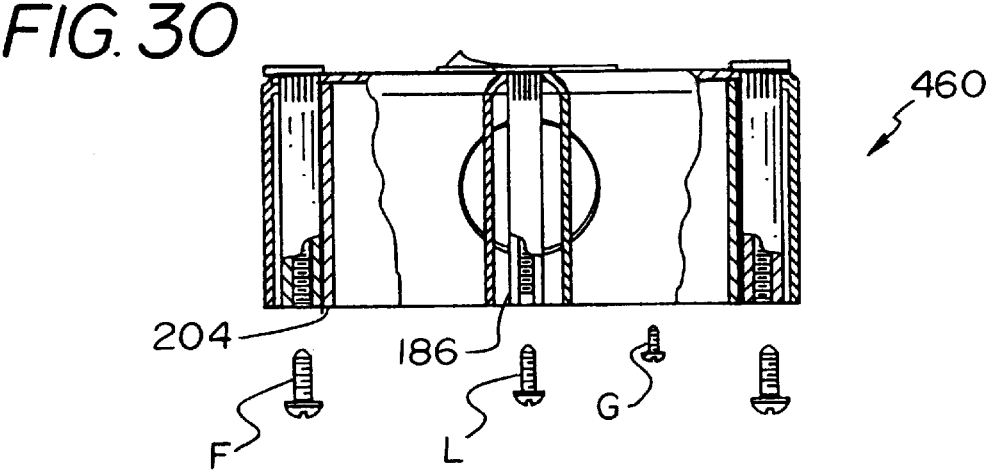
FIG. 30 is a cross-sectional view of the junction box of FIG. 29.
Figure 31:
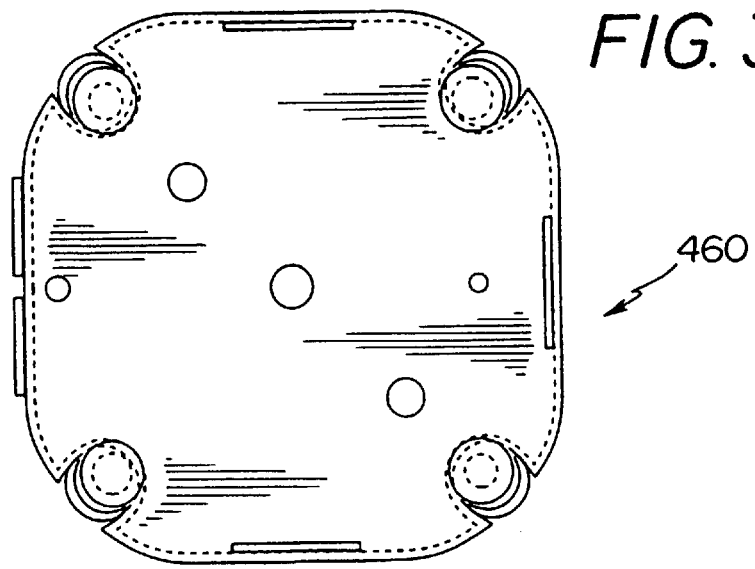
FIG. 31 is a plan view of FIG. 29.

FIGS. 29–31 illustrate another preferred embodiment of a junction box 460 according to the invention.

Junction box 460 may include one or more fixture supports 204 disposed within respective open cavities 262 defined by walls 264, as described in connection with box 260 of FIG. 15 above.

In addition, box 460 may be provided with one or more additional fixture supports 186 configured for receiving fasteners L, fixture supports 186 being disposed within respective cavities 462.

As shown, paired fixture supports 186 are provided for securing a first fastener of the type used for securing lights such as 8–32 fasteners; and, fixture supports 204 are provided for securing fasteners F of the type having 10–32 fasteners, so that the object of achieving two (2) boxes in one is achieved.

Box 460 likewise is free of fixture supports within the main box cavity.

It should be noted that, typically, each of the respective dimpled portions are angled so that respective fixture supports 186 and 204 will abut respective cavity-defining walls 464 and 264 for strengthening the connection between fixture support 204 and 186 and the remainder of box 460, and for ensuring that the lower ends of supports 186 and 204 are located in the intended locations to further speed up the installation of fixtures to be supported by box 460.

Figure 32:
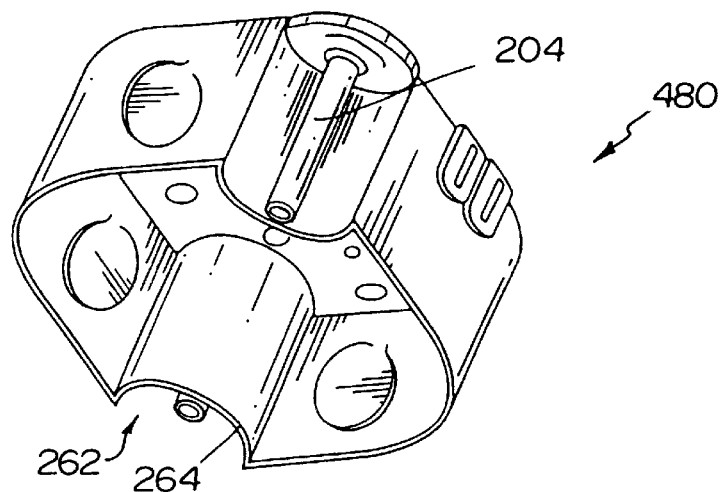
FIG. 32 is a view of another preferred embodiment of a junction box according to the invention.
Figure 33:
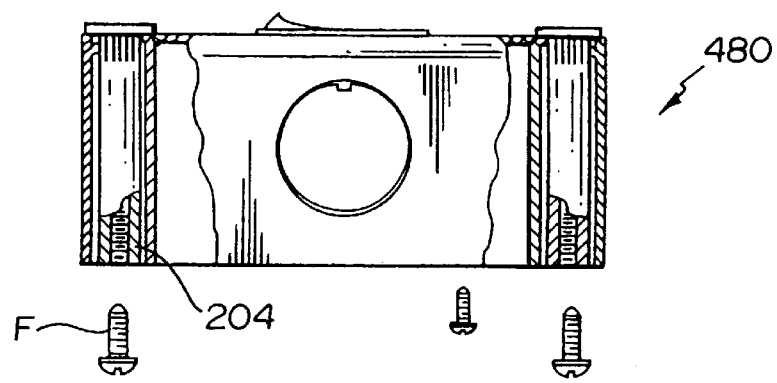
FIG. 33 is a cross-sectional view of the junction box of FIG. 32.
Figure 34:
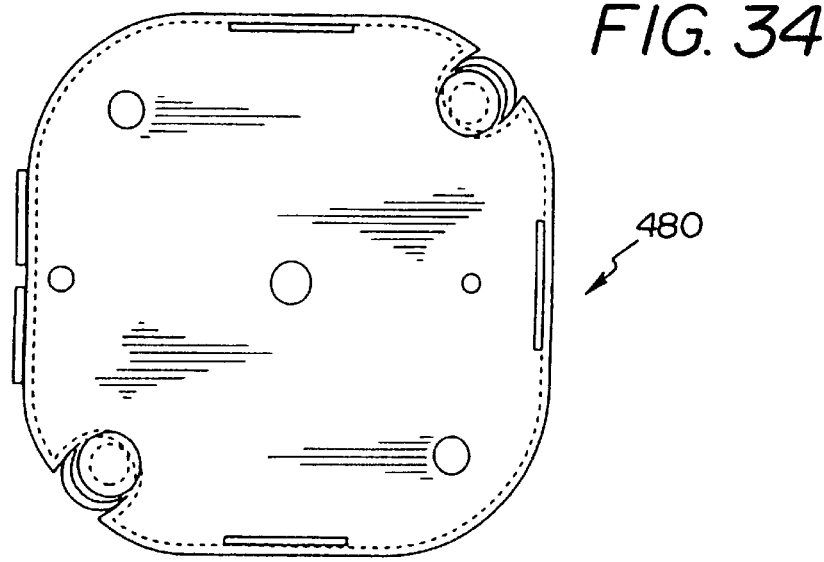
FIG. 34 is a plan view of a further preferred embodiment of a junction box according to the invention.

FIGS. 32–34 show a preferred embodiment of a junction box 480 according to the invention.

Junction box 480 is similar to junction box 460 of FIG. 29, yet with the provision of, typically, a pair of fixture supports 204 disposed in cavities 262 defined by walls 264. Thus, junction box 480 will typically be used for installations when it is known that a box dedicated for securing one type of fastener F is required.

Figure 36:
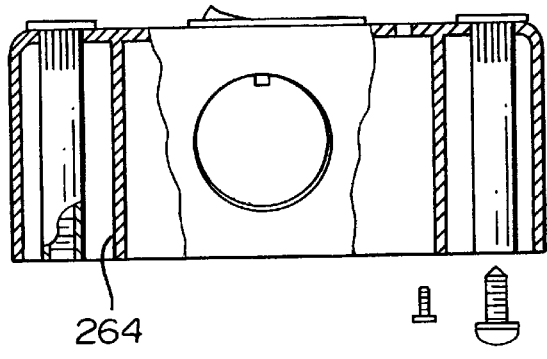
FIG. 36 is a sectional view of FIG. 35.
Figure 35:
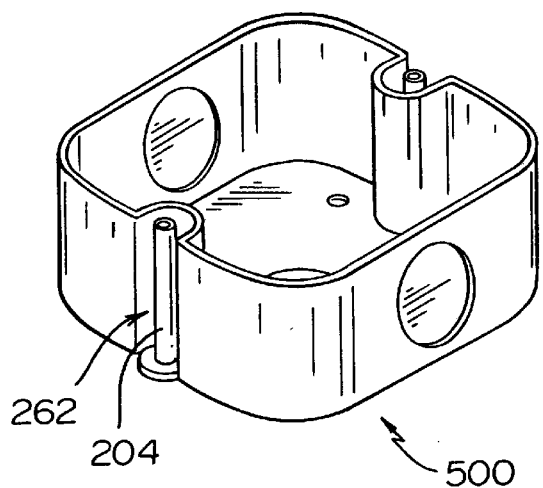
FIG. 35 is a view of another preferred embodiment of a junction box according to the invention.

FIGS. 35 and 36 show another preferred embodiment of a junction box 500 according to the invention.

Junction box 500 includes one or more fixture supports 204 disposed in respective opened wall cavities 262, as described regarding box 480 of FIG. 32 above, for example. Supports 204 may extend downwardly along wall 264 of cavity 262, as shown; or supports 204 may be tilted inwardly toward wall 262 and abut a lower portion of wall 262, as in the embodiment of FIGS. 32–34.

Figure 38:
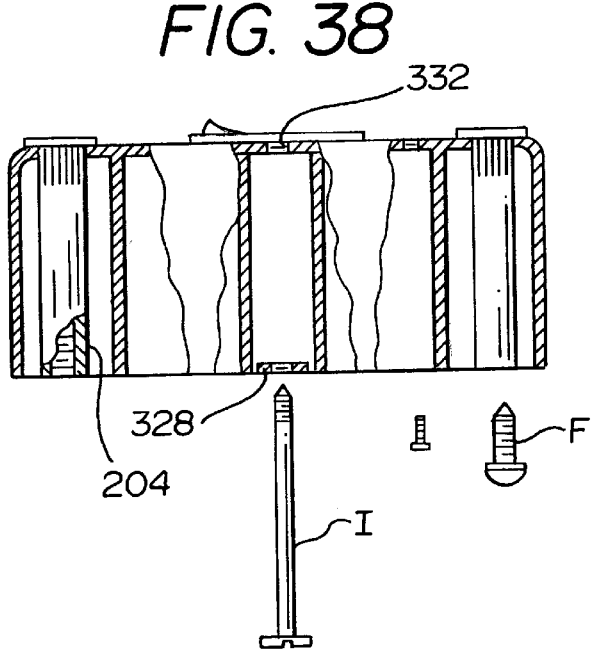
FIG. 38 is a sectional view of the junction box of FIG. 37.
Figure 37:
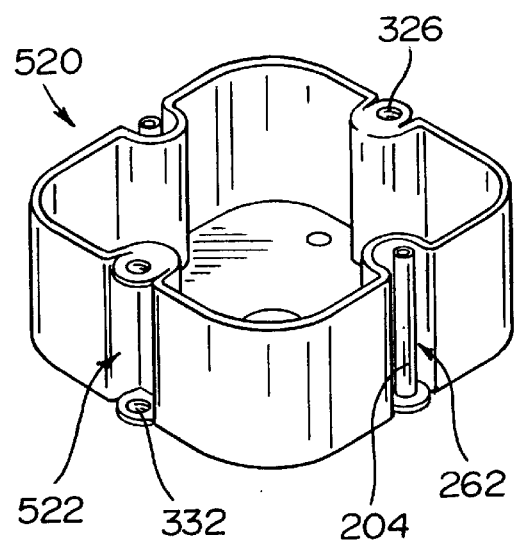
FIG. 37 is a view of a further preferred embodiment of the invention.

FIGS. 37 and 38 show another preferred embodiment of a junction box 520 according to the invention. Junction box 520 may be provided with fixture supports 204 sized for receiving fasteners F, as described in earlier embodiments. In addition, one or more open walled cavities 522 may be provided. Open walled cavities 522 are sized for receiving fasteners I of the type which extend through ears 328 and are secured to threaded holes 332, as described in connection with the junction box 440 of FIGS. 27 and 28, for example. As in many of the other preferred embodiments, box 520 provides for two (2) boxes in one and not only reduces the amount of inventory required, but ensures that the installer is more likely to have the proper box on hand for attaching a fixture.

Figure 39:
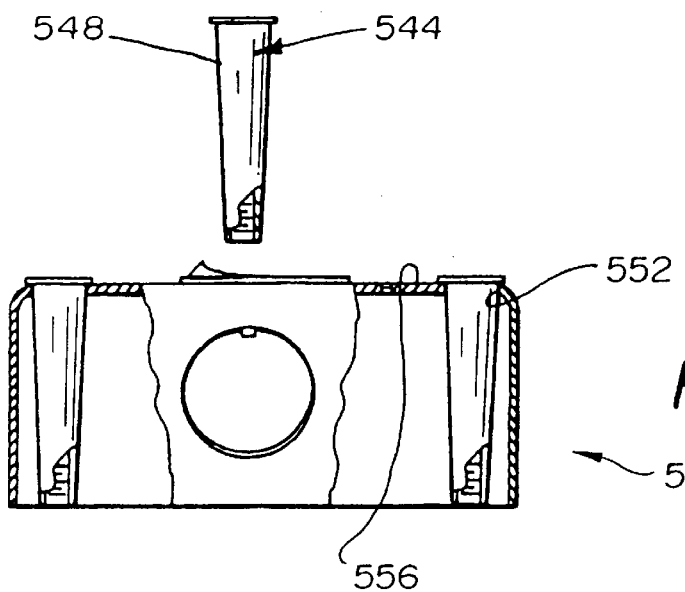
FIG. 39 is a sectional view of yet another preferred embodiment of a junction box according to the invention.

FIG. 39 illustrates another preferred embodiment of a junction box 540 according to the invention.

Junction box 540 includes one or more fixture supports 544, which may have a substantially smooth outer surface 548. Outer surface 548 is preferably sufficiently smooth so as to not abraid wiring disposed in the cavity of box 540 during use. Fixture support 544 may be substantially tapered, such as in the shape of the illustrated truncated cone.

Box 540 may be provided with a hole 552 for receiving respective ones of fixture supports 544. Hole 552 may be provided with an initial diameter less than the maximum outer diameter of fixture support 544, so that fixture support 554 is securely engaged in top wall 556 of box 540. The relative sizes of hole 552 and support 554 may be selected, and the force with which 544 is installed in top wall 556 through hole 552 may be determined, so that a dimpling of top wall 556 occurs during assembling of box 540. This is shown in exaggerated form and described in connection with the following preferred embodiments shown in FIG. 40A.

Figure 40:
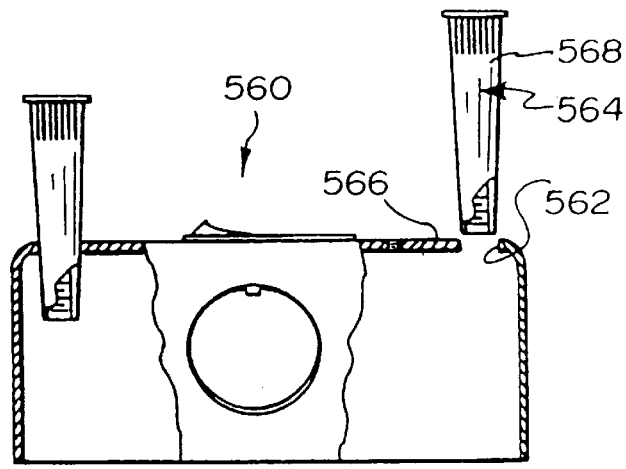
FIG. 40 is a sectional view of another preferred embodiment of o a junction box according to the invention.
Figure 40A:
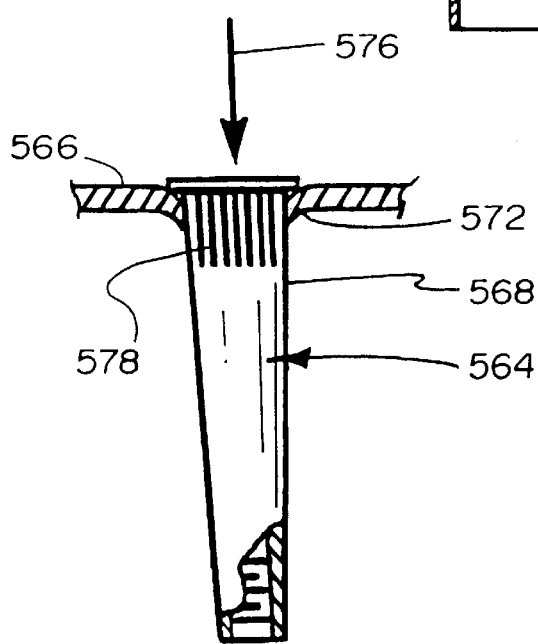
FIG. 40A is a partial sectional view of the box of FIG. 40 when the fixture support has been installed.

FIGS. 40 and 40A illustrates another preferred embodiment of a junction box 560 according to the invention. Box 560 includes one or more fixture supports 564 having outer surfaces 568 sized for engaging with holes 562 provided in the top wall 566 of junction box 560.

As best seen in FIG. 40A, support 564 causes dimpling of top wall 566 when support 564 is installed in the direction of arrow 576. The dimpling is illustrated in region 572. A friction surface or roughened surface or fluting 578 may likewise be provided, as described above.

FIG. 41 illustrates a junction box 580 according to the invention. Junction box 580 includes pre-formed holes 582 in top wall 586 thereof. Holes 582 may be sized so that fixture supports 204 cause dimpling of top wall 586 in the region of hole 582 when supports 240 are assembled with remainder of box 580. Such dimpling is discussed above in connection with FIG. 40A, and in connection with FIG. 39, for example.

Box 580 is made of relatively thick (e.g., heavy gage) material, such as steel. Although the thicker the top wall of junction box 580, the less the dimpling effect will be, there will still be dimpling. One may select the sheet metal stamping or hole punching process for forming holes 582 so as to ensure the desired amount of dimpling for securing fixture supports 204, even when using relatively thick-walled material for forming box 580.

Furthermore, even if holes 582 are drilled, the drilling operation, the speed of the drilling, and the size of the drill bits may be selected so that sufficient heating of the material of the top wall 586 is achieved, whereby dimpling (i.e., in such case controlled deforming) of top wall 586 is ensured before, during, and/or after the insertion of fixture support 204 into hole 582.

FIG. 42 illustrates another embodiment of a junction box 600 according to the invention. Junction box 600 includes fixture supports 204 which are disposed in respective holes 602 formed in a relatively thin top wall 606 thereof.

As will be readily appreciated, the thinner the top wall 606 is, the easier it will be to achieve the desired dimpling effect. The desired dimpling of top wall 606 for securing supports 204 to the remainder of box 600 may be achieved in the same manner as described above in connection with box 580 of FIG. 41.

FIG. 43 shows another preferred embodiment of a junction box 620 according to the invention that has fixture supports 204 of the type sized for receiving fixture fasteners F, as described above in connection with FIG. 33, for example. As in others of the embodiments, one or more holes may be provided for receiving a ground screw G.

Junction box 620 features fixture support 204 contained within the main cavity of the box.

FIG. 44 illustrates another preferred embodiment of a junction box 640 according to invention that is similar to the junction box 620 of FIG. 43. However, fixture supports 204 are disposed outside of the main cavity of box 620. For example, fixture supports 204 may be contained within open walled cavities 262 of the type described in connection with junction box 480 of FIG. 32 above. Unlike junction box 480 of the preferred embodiment of FIGS. 32–34, fixture supports 204 extend downwardly inside cavities 262 without engaging side walls 264 thereof. The thickness of top wall 646 of junction box 640, the size of fixture supports 204, the initial size of respective holes 652 (both before and after insertion of supports 204 therein), and the force with which supports 204 are inserted into the remainder of box 640 during assembly thereof may all be selected so that the assembly of box 640 achieves the desired dimpling of top wall 646 in the region of a hole 652 for achieving the desired strength of engagement and the desired disposition of fixture support 204 relative to side wall 264. Such dimpling during assembly of box 640 will typically occur when fixture support 204 is inserted into hole 652 in the direction of arrow 656. The dimpling of top wall 646 may likewise be appreciated by considering the embodiments of FIGS. 39–41 described above, for example.

FIGS. 45–48 show another preferred embodiment of a junction box 660 according to the invention.

Junction box 660 is a structurally enhanced junction box, that may include a single support for carrying the load of fixtures mounted thereto. The single support may support fixtures of the type that require one or more fasteners attached at various locations on the fixture and, hence, that require attachment locations to one or more respective places on or near junction box 660.

Box 660 may include a top wall 664 having an opening or hole 668 therein, and a downwardly extending side wall 672. A support element, such as a fixture support plate 674 may be provided for supporting one or more electrical fixture fasteners, for example. Support plate 674 may include one or more first openings or through holes 676 and one or more second openings or through holes 678. It is contemplated that openings 676 be spaced apart and sized for securing the first type of fixture fastener L and openings 678 be spaced apart and sized for supporting a second type of fixture fastener F, as will be readily appreciated.

One or more openings or holes 680 may likewise be provided in support plate 674. Openings 680 may be located for cooperating with the remainder of box 660 and, specifically with hole 668 in top wall 664, as shown, when support plate 674 is secured to box 660.

During manufacture, or prior to use, the box 660 will be assembled by inserting a main support 688, such as the illustrated single fastener, through hole 668. Main support 688 may include a head or other engagement element 692 for securing support 688 to top wall 664. Main support 688 will then be secured to support plate 674 by use of a further securing element 694, such as the illustrated nut.

As can be appreciated from FIGS. 45–48, one or more outer free ends 698 of plate 674 may engage lower portions of side walls 672, so that when securing element or nut 694 is in place, owing to the threads on main support 688, nut 694 will tend to force support plate 674 upwardly and head 692 will tend to force top wall 664 downwardly so that support plate 674 is fixedly secured to the remainder of box 660. In other words, when nut 694 is turned in a direction for reducing the distance between nut 694 and head 692, and plate 674 engages the lower portion of side wall 672 (i.e., the top of cutout 682) top wall 664 and support plate 674 will be pulled toward each other and, hence, will clamp plate 674 to the remainder of box 660. When top wall 664 is forced downwardly toward plate 674 by the movement of nut 694 relative to head 692, side wall 672 will likewise be forced downwardly and the desired engagement will be achieved.

A further securing element, such as the illustrated nut 696, may be provided for clamping plate 674 between nuts 694 and further nut 696. It will be appreciated that support plate 674 may be made of a material which is thicker or thinner than the material of top wall 664 and side wall 672. In the case of top wall 664 and side wall 672 of conventional thickness and size, plate 674 may have a width of one inch, for example.

The various elements may be sized so that the securing of plate 674 causes dimpling of top wall 664 in the region of head 692, if desired.

It will likewise be appreciated that main support 688 may be provided with threads only at a lower most portion thereof, so that in use there are no threads exposed within the main cavity of junction box 660, as in the other described embodiments.

It will be appreciated that the structure of junction box 660 has enhanced strength and load-carrying characteristics, thanks to plate 674 being fixedly secured to side wall 672 and top wall 674. In that manner, a complete box 660 having a completely tied together structure is realized. For example, a connection is established between plate 674, free end 698 thereof, side wall 672, top wall 664, and the opposite free end 698 of support plate 674. In addition, main support 688 ties together a further portion of box 660 disposed within the main cavity thereof, such as at the substantially centrally located position as shown.

Box 660 may be attached to a support surface by the use of side mounting plate 270, doubled-sided tape 100, and/or fasteners inserted through holes 29 in top wall 664, as described in earlier embodiments.

FIGS. 49–51 illustrate a further preferred embodiment of a junction box 720 according to the invention.

Box 720 includes a top wall 724 and a downwardly extending side wall 728 defining a main cavity therein.

Box 720 is particularly suited for heavy duty applications owing to its provision of a fixture support element or plate 730 fixedly secured to the remainder of box 720.

Support element 730 may include one or more outwardly extending plates 734 having one or more first openings or holes 736 and one or more second openings or holes 738 therein. As in others of the preferred embodiments described above, hole 736 may be sized for receiving a first type of fixture fastener L and hole 738 may be sized for receiving a second type of fixture fastener F, such as 8–32 and 10–32 fasteners, respectively.

Support element 730 may also include an upper strengthening element 744, such as the illustrated plate, having an opening 742 therein. Opening 742 may be sized for being aligned with and disposed under opening 743 in top wall 724.

Upper plate 744 may be offset from plate 734 by one or more side plates 746.

An opening, such as a cutout or through hole 750 may be provided in side wall 728. A cutout 750 may be similar to cutout 682 of junction box 660 of FIG. 45.

During manufacture, or at some point prior to installation before wiring of the box by the installer, support element 730 will be associated with the remainder of box 720. Support plate 730 may be fixedly secured to side wall 728, and hence the remainder of box 720, in a manner similar to the assembly of box 660 of FIG. 45. In the present embodiment, a support, such as the illustrated fastener 770 is inserted through hole 743 in top wall 724. As shown, a roughened surface such as fluting may be provided on an upper portion of support 770 for enhancing the engagement between 770 and top wall 724. Support 770 is inserted through opening 742 in top plate 744 of support element 730 and secured thereto. A head 774 may be provided on support 770 for enhancing the engagement between support 770 and the remainder of box 720; e.g., between support 770 and top wall 724.

A securing or locking element such as the illustrated nut 776, may also be used for enhancing the engagement between support 770 and or top plate 744 of support element 730.

To further enhance the engagement between support 770 and the remainder of the box, a further securing or locking element 780, such as the illustrated nut or locking nut 780 may be provided at a lower portion thereof. Nut 780 may be sized so as to engage a lower face 782 of support 730. In that manner, 780 may cooperate with head 774 in order to clamp top wall 724, side wall 728, and support element 730 together, in order to achieve the desired unified junction box 720.

FIGS. 52 and 53 illustrate another preferred embodiment of a junction box 800 according to the invention. Box 800 includes top wall 724, side wall 728, and cutout or through hole 750, as in the box 720 of FIGS. 49–51.

In addition, box 800 includes a main support element or fixture support plate 830 having one or more openings or through holes 838 therein. Support element 830 may be secured to the remainder of box 800 in a manner similar to the securing of support plate 730 to the remainder of box 720 of the embodiment of FIGS. 49–51.

It will be noted that in the embodiments of FIGS. 49–51 and 52–53, fixture support 770 may have exposed portions within the main cavity of the respective boxes 720 and 800 so as to avoid abrading and wear to wiring and insulation disposed within the boxes; or, given that side plates 746 and 846 provide some degree of protection to wiring disposed in the box from abrasive action caused by support 770 (when support 770 has exposed threads or other rough surfaces), so that no further protection of the wiring may be necessary other than that afforded by such side plate 746 and 846.

Variations

The term "fasteners" is intended to include all types of screws, bolts, and rivets, as well as the gripping extensions 150 of FIG. 9, for example.

It is contemplated that the components of the various embodiments be exchanged for or added to the components of the other embodiments.

It will be appreciated that these are merely examples of solutions to the problems set forth in my accompanying drawings and description, and, taken in its entirety, it will be appreciated that all the above objects of the invention, as well as many others, have been fulfilled.

It will likewise be appreciated that all the components described in the foregoing can be made of a variety of materials, such as steel, zinc, nylon, and other plastics, as the producer and user demand.

While this invention has been described as having a preferred design, it is understood that it is capable of further modification, uses and/or adaptations following in general the principle of the invention and including such departures from the present disclosures as come within known or customary practice in the art to which the invention pertains, and as may be applied to the essential features set forth, and fall within the scope of the invention or the limits of the appended claims.

I claim:

1. A mounting assembly, comprising:
   a) a box including a top wall and a side wall;
   b) said side wall extending downwardly away from said top wall and defining a cavity therein;
   c) a fixture support;
   d) said fixture support being disposed adjacent said side wall;
   e) a dimple being provided in said top wall; and
   f) a lower face of said dimple being configured for enhancing the engagement of the fixture support with said top wall.

2. A device as defined in claim 1, wherein:
   a) said dimple is provided adjacent said side wall of said box.

3. A device as defined in claim 1, wherein:
   a) said fixture support engages said side wall.

4. A device as defined in claim 1, wherein:
   a) said fixture support extends outwardly of said box.

5. A device as defined in claim 1, wherein:
   a) a threaded hole is provided on said fixture support.

6. A device as defined in claim 1, wherein:
   a) said fixture support has an exposed surface which is sufficiently smooth for avoiding wear to wiring which engages said exposed surface when said junction box is in use.

7. A device as defined in claim 1, wherein:
   a) said fixture support includes a stud.

8. A device as defined in claim 1, wherein:
   a) said fixture support extends substantially the entire length from said top wall of said box to a bottom portion thereof.

9. A device as defined in claim 1, wherein:
   a) said fixture support extends through an opening in said dimple; and
   b) said dimple is configured for moving a lower portion of said fixture support toward said side wall when said fastener secures said fixture support to said top wall.

10. A device as defined in claim 1, wherein:
    a) a fixture support-receiving cavity is provided on said box; and
    b) said fixture support-receiving cavity is substantially free of connection with said cavity of said box.

11. A device as defined in claim 1, wherein:
    a) said fixture support includes two or more first fixture supports configured for securing a first type of fixture fastener.

12. A device as defined in claim 11, wherein:
a) said fixture support includes two or more second fixture supports configured for receiving a type of fixture fastener which differs from the fixture fastener secured by the first fixture support.

13. A device as defined in claim 1, wherein:
a) a side mounting plate is provided on said box.

14. A device as defined in claim 13, wherein:
a) one or more holes is provided in said side mounting plate for securing said side mounting plate to a support; and
b) said holes include at least one extension, and said extension is configured for engaging a fastener disposed in said hole in said side mounting.

15. A device as defined in claim 1, wherein:
a) said fixture support includes at least one extension having a hole therein sized for receiving a fastener therethrough and at least one corresponding hole in a top portion of said box, so that in use, a fastener may be inserted through both said holes; and
b) said fixture support includes a further type of fixture support which supports a fastener differing from the fixture fastener disposable in said holes of said extension and said upper portion.

16. A method of producing a junction box, including:
a) providing a junction box;
b) providing a fixture support; and
c) inserting said fixture support through a wall of said junction box sufficiently far so as to cause dimpling in the region between the fixture support and the wall of the junction box, said dimpling being configured for securing the fixture support to the junction box.

17. A mounting assembly, comprising:
a) a junction box having a top wall and a downwardly extending side wall defining a cavity therein;
b) a fixture support element;
c) a support extending between said fixture support element and said top wall; and
d) at least one fixture fastener provided on said fixture support element.

18. A mounting assembly as defined in claim 17, wherein:
a) said at least one fixture fastener includes two different types of fixture fasteners sized for receiving two different types of fixture fasteners of a fixture secured thereto.

19. A mounting assembly as defined in claim 17, wherein:
a) said support includes a clamping element which clamps said fixture support element to said top wall.

20. A mounting assembly as defined in claim 17, wherein:
b) an opening is provided in said side wall; and
c) said fixture support element extends into a portion of said opening.

* * * * *